(12) United States Patent
Yeh

(10) Patent No.: US 12,340,037 B2
(45) Date of Patent: Jun. 24, 2025

(54) ACTIVE STYLUS AND PROCESSING CIRCUITS AND METHOD THEREOF, TOUCH SENSITIVE PROCESSING APPARATUS AND METHOD THEREOF, AND TOUCH SYSTEM

(71) Applicant: EGALAX_EMPIA TECHNOLOGY INC., Taipei (TW)

(72) Inventor: Shang-Tai Yeh, Taipei (TW)

(73) Assignee: EGALAX_EMPIA TECHNOLOGY INC., Taipei (TW)

( * ) Notice: Subject to any disclaimer, the term of this patent is extended or adjusted under 35 U.S.C. 154(b) by 0 days.

(21) Appl. No.: 18/540,956

(22) Filed: Dec. 15, 2023

(65) Prior Publication Data

US 2025/0155998 A1 May 15, 2025

(30) Foreign Application Priority Data

Nov. 14, 2023 (TW) .................... 112143937

(51) Int. Cl.
| | |
|---|---|
| G06F 3/045 | (2006.01) |
| G06F 3/0354 | (2013.01) |
| G06F 3/038 | (2013.01) |
| G06F 3/041 | (2006.01) |
| G06F 3/044 | (2006.01) |

(52) U.S. Cl.
CPC ........ *G06F 3/0383* (2013.01); *G06F 3/03545* (2013.01); *G06F 3/04162* (2019.05); *G06F 3/0441* (2019.05); *G06F 3/0442* (2019.05)

(58) Field of Classification Search
CPC ............... G06F 3/03545; G06F 3/0383; G06F 3/04162; G06F 3/0441; G06F 3/0442
See application file for complete search history.

(56) References Cited

U.S. PATENT DOCUMENTS

| | | | |
|---|---|---|---|
| 8,928,635 B2* | 1/2015 | Harley | G06F 3/0446 345/173 |
| 9,619,052 B2* | 4/2017 | Bernstein | G06F 3/04883 |
| 10,890,987 B2 | 1/2021 | Chang et al. | |
| 11,016,617 B2* | 5/2021 | Chang | G06F 3/044 |
| 11,169,626 B2 | 11/2021 | Chang et al. | |
| 11,237,648 B2* | 2/2022 | Chang | G06F 3/04166 |
| 11,360,586 B2* | 6/2022 | Yamamoto | G06F 3/04162 |
| 11,449,170 B2* | 9/2022 | Yeh | G06F 3/04162 |
| 12,153,764 B1* | 11/2024 | Smith | G06F 3/0441 |
| 2013/0106722 A1* | 5/2013 | Shahparnia | G06F 3/04164 345/173 |
| 2016/0282965 A1 | 9/2016 | Jensen et al. | |
| 2018/0314364 A1* | 11/2018 | Yeh | G06F 3/0383 |

FOREIGN PATENT DOCUMENTS

| | | |
|---|---|---|
| TW | I775237 B | 8/2022 |
| TW | I778485 B | 9/2022 |

* cited by examiner

*Primary Examiner* — Joe H Cheng
(74) *Attorney, Agent, or Firm* — WPAT, PC

(57) ABSTRACT

The present application is related to active stylus which can detect beacon signals via its head and tail and is also related to touch sensitive processing apparatus and touch system corresponding to the active stylus. According to received signals during a head signal period and a tail signal period after the beacon signals is received, the touch sensitive processing apparatus can determine an approximating or touching position of the active stylus and a head or tail information. Based on the head or tail information, the touch system can respond differently.

40 Claims, 11 Drawing Sheets

ACTIVE STYLUS AND PROCESSING
CIRCUITS AND METHOD THEREOF,
TOUCH SENSITIVE PROCESSING
APPARATUS AND METHOD THEREOF, AND
TOUCH SYSTEM

CROSS REFERENCE TO RELATED PATENT
APPLICATION

This patent application is based on a Taiwan, R.O.C. patent application No. 112143937 filed on Nov. 14, 2023.

FIELD OF THE INVENTION

The present invention relates to active stylus, and more particularly, to active stylus which detects beacon signal via head and tail simultaneously.

BACKGROUND OF THE INVENTION

Traditional touch panel or screen can be used to detect external conductive objects by utilizing mutual capacitance principle. For examples, finger or passive stylus can help to leak electric charges stored in capacitances between touch electrodes to ground. However, the mutual capacitance principle cannot be used to distinguish a finger and a passive stylus. An active stylus can actively transmit electrical signals to touch panel or screen such that touch sensitive processing apparatus coupled to the touch panel or screen can distinguish finger and the active stylus.

Comparing with passive stylus, a drawback of traditional active stylus is that the active stylus equips with only one head electrode such that the active stylus cannot be used to additional touch control via its tail. Moreover, the traditional active stylus has more components and cost more. It consumes more energy. It is also not resistant of falling and shaking. Active stylus often broke after falling to ground from desktop. Thus, it is desired to have an active stylus with less components, which costs less, consumes less energy, and is more resistant to failing and shaking. It can further be used to perform additional touch functions via its tail.

SUMMARY OF THE INVENTION

According to an embodiment of the present application, a processing circuit applicable to an active stylus is provided. The processing circuit comprising: a driving circuit for emitting electrical signals; a sensing circuit for detecting beacon signals; an interconnection network for connecting a head electrode and a tail electrode located in both ends of the active stylus, respectively; and a control circuit configured for: having the interconnection network concurrently connect the sensing circuit with the head electrode and the tail electrode, and having the sensing circuit detect the beacon signals during a beacon signal period; and after the beacon signals are detected by the sensing circuit, performing following: having the interconnection network connect the driving circuit with the tail electrode, and having the driving circuit emit a tail signal during a tail signal period which is after the beacon signal period; and having the interconnection network connect the driving circuit with the head electrode, and having the driving circuit emit a head signal during a head signal period which is after the beacon signal period.

Preferably, in order to save cost and power, to improve fall-resistance and shock-resistance, and to avoid synchronization issue of having two receiving channels, such that the tail signal period and the head signal period can be closely adjacent to each other and no guard period is in need, wherein the sensing circuit comprises components for one single channel for concurrently detect the beacon signals from the head electrode and the tail electrode, wherein the tail signal period and the head signal period are adjacent to each other and no guard period is in between.

Preferably, in order to provide pressure information to touch sensitive processing apparatus, the active stylus further comprises a component with fixed resistance and a force sensing component, wherein resistance of the force sensing component would be varied according to pressure applied to the head electrode, first head signal in a first modulation provided by the driving circuit propagates through the component with fixed resistance to the head electrode, second head signal in a second modulation provided by the driving circuit propagates through the force sensing component to the head electrode.

Preferably, in order to save cost and power, to improve fall-resistance and shock-resistance, wherein the driving circuit comprises components for one single channel, the first head signal is provided by the driving circuit during a first head signal period of the head signal period, the second head signal is provided by the driving circuit during a second head signal period of the head signal period.

Preferably, in order to provide additional information to touch sensitive processing apparatus, wherein the head electrode comprises a tip electrode and one or more ring electrodes, wherein one of the ends of the active stylus are surround by the one or more ring electrodes, the first head signal is provided by the driving circuit during a first head signal period of the head signal period to the tip electrode, a third head signal is provided by the driving circuit during a third head signal period of the head signal period to the one or more ring electrodes.

Preferably, in order to save cost and power, to improve fall-resistance and shock-resistance, wherein the driving circuit comprises components for one single channel, the first head signal is provided by the driving circuit during a first head signal period of the head signal period, the third head signal is provided by the driving circuit during a third head signal period of the head signal period.

Preferably, in order to adjust configuration conveniently, wherein the processing circuit further comprises a processor for executing instructions stored in a non-volatile memory to implement the control circuit.

According to an embodiment of the present application, an active stylus is provided. The active stylus comprises the head electrode, the tail electrode, and the processing circuit.

According to an embodiment of the present application, a processing method for an active stylus is provided. The active stylus comprises a head electrode and a tail electrode located in both ends of the active stylus, respectively, the processing method comprising: having an interconnection network of the active stylus concurrently connect a sensing circuit of the active stylus with the head electrode and the tail electrode, and having the sensing circuit detect beacon signals during a beacon signal period; and after the beacon signals are detected by the sensing circuit, performing following steps: having the interconnection network connect a driving circuit of the active stylus with the tail electrode, and having the driving circuit emit a tail signal during a tail signal period which is after the beacon signal period; and having the interconnection network connect the driving circuit with the head electrode, and having the driving circuit emit a head signal during a head signal period which is after the beacon signal period.

Preferably, in order to save cost and power, to improve fall-resistance and shock-resistance, and to avoid synchronization issue of having two receiving channels, such that the tail signal period and the head signal period can be closely adjacent to each other and no guard period is in need, wherein the sensing circuit comprises components for one single channel for concurrently detect the beacon signals from the head electrode and the tail electrode, wherein the tail signal period and the head signal period are adjacent to each other and no guard period is in between.

Preferably, in order to provide pressure information to touch sensitive processing apparatus, the active stylus further comprises a component with fixed resistance and a force sensing component, wherein resistance of the force sensing component would be varied according to pressure applied to the head electrode, the processing method of the active stylus further comprises: having the driving circuit provide a first head signal in a first modulation to the head electrode through the component with fixed resistance; and having the driving circuit provide a second head signal in a second modulation to the head electrode through the force sensing component.

Preferably, in order to save cost and power, to improve fall-resistance and shock-resistance, wherein the driving circuit comprises components for one single channel, the first head signal is provided by the driving circuit during a first head signal period of the head signal period, the second head signal is provided by the driving circuit during a second head signal period of the head signal period.

Preferably, in order to provide additional information to touch sensitive processing apparatus, wherein the head electrode comprises a tip electrode and one or more ring electrodes, wherein one of the ends of the active stylus are surround by the one or more ring electrodes, the processing method of the active stylus further comprises: having the driving circuit provide a first head signal in a first modulation to the tip electrode; and having the driving circuit provide a third head signal in a third modulation to one or more ring electrodes.

Preferably, in order to save cost and power, to improve fall-resistance and shock-resistance, wherein the driving circuit comprises components for one single channel, the first head signal is provided by the driving circuit during a first head signal period of the head signal period, the third head signal is provided by the driving circuit during a third head signal period of the head signal period.

According to an embodiment of the present application, a touch sensitive processing apparatus applicable to a touch panel is provided. The touch panel comprises multiple first electrodes in parallel to a first axis and multiple second electrodes in parallel to a second axis. The touch sensitive processing apparatus comprising: an interconnection network module for connecting the first electrodes and the second electrodes, respectively; a driving circuit module for providing driving signal; a sensing circuit module for sensing electrical signals; and a processor module for executing instructions stored in a non-volatile memory to realize: selecting one of the first electrodes in turns and performing following: having the interconnection network module connect the driving circuit module to the selected first electrodes; having the interconnection network module connect the sensing circuit module to the second electrodes; having the driving circuit module emit the driving signal; having the sensing circuit module sense tail signals during a tail signal period for gathering one-dimensional tail signal sensing information; and having the sensing circuit module sense head signals during a tail signal period for gathering one-dimensional head signal sensing information; forming a tail signal sensing image by all of the one-dimensional tail signal sensing information; forming a head signal sensing image by all of the one-dimensional head signal sensing information; and calculating an approaching or touching position of the active stylus and a touching end information related to which one of a head end and a tail end of the active stylus approaching or touching the touch panel according to the tail signal sensing image and the head signal sensing image.

Preferably, in order to save cost and power, to improve fall-resistance and shock-resistance, and to avoid synchronization issue of having two receiving channels, wherein the tail signal period and the head signal period are adjacent to each other, and no guard period is in between.

Preferably, in order to provide pressure information to touch sensitive processing apparatus, wherein the one-dimensional head signal sensing information comprises sensing information of a first head signal and a second head signal, signal strength of the second head signal is corresponding to a pressure on a force sensing component installed in a head end of the active stylus, the processor module is further configured for calculating a value of the pressure according to signal strengths of the first head signal and the second head signal.

Preferably, in order to save cost and power, to improve fall-resistance and shock-resistance, the driving circuit of the active stylus comprises components for one single channel, wherein the sensing circuit module sense the first head signal during a first head signal period of the head signal period, and the sensing circuit module sense the second head signal during a second head signal period of the head signal period.

Preferably, in order to provide additional information to touch sensitive processing apparatus, wherein the head electrode comprises a tip electrode and one or more ring electrodes, wherein the head end of the active stylus are surround by the one or more ring electrodes, wherein the one-dimensional head signal sensing information comprises sensing information of a first head signal and a third head signal, wherein the first head signal is emitted by the tip electrode, the third head signal is emitted by the one or more ring electrodes, the processor module is further configured for: calculating two approaching or touching positions of the ring electrodes and the one or more ring electrodes according to the head signal sensing image; calculating a projected direction of the active stylus according to the two approaching or touching positions; and calculating a tilt angle between the active stylus and the touch panel according to the two approaching or touching positions and an arrangement between the tip electrode and the one or more ring electrodes.

Preferably, in order to save cost and power, to improve fall-resistance and shock-resistance, wherein the driving circuit comprises components for one single channel, the sensing circuit module is configured to sense the first head signal during a first head signal period of the head signal period, the sensing circuit module is configured to sense the third head signal during a third head signal period of the head signal period.

According to an embodiment of the present application, a touch sensitive processing method for a touch sensitive processing apparatus which is applicable to a touch panel is provided. The touch panel comprises multiple first electrodes in parallel to a first axis and multiple second electrodes in parallel to a second axis. The touch sensitive processing method comprising: selecting one of the first electrodes in turns and performing following steps: having an interconnection network module of the touch sensitive processing apparatus connect a driving circuit module of the touch sensitive processing apparatus to the selected first electrode; having the interconnection network module connect a sensing circuit module of the touch sensitive processing apparatus to the second electrodes; having the driving circuit module emit the driving signal; having the sensing circuit module sense tail signals during a tail signal period for gathering one-dimensional tail signal sensing information; and having the sensing circuit module sense head signals during a tail signal period for gathering one-dimensional head signal sensing information; forming a tail signal sensing image by all of the one-dimensional tail signal sensing information; forming a head signal sensing image by all of the one-dimensional head signal sensing information; and calculating an approaching or touching position of the active stylus and a touching end information related to which one of a head end and a tail end of the active stylus approaching or touching the touch panel according to the tail signal sensing image and the head signal sensing image.

Preferably, in order to save cost and power, to improve fall-resistance and shock-resistance, and to avoid synchronization issue of having two receiving channels, wherein the tail signal period and the head signal period are adjacent to each other, and no guard period is in between.

Preferably, in order to provide pressure information to touch sensitive processing apparatus, wherein the one-dimensional head signal sensing information comprises sensing information of a first head signal and a second head signal, signal strength of the second head signal is corresponding to a pressure on a force sensing component installed in a head end of the active stylus, the touch sensitive processing method further comprises calculating a value of the pressure according to signal strengths of the first head signal and the second head signal.

Preferably, in order to save cost and power, to improve fall-resistance and shock-resistance, the driving circuit of the active stylus comprises components for one single channel, wherein the sensing circuit module sense the first head signal during a first head signal period of the head signal period, and the sensing circuit module sense the second head signal during a second head signal period of the head signal period.

Preferably, in order to provide additional information to touch sensitive processing apparatus, wherein the head electrode comprises a tip electrode and one or more ring electrodes, wherein one of the ends of the active stylus are surround by the one or more ring electrodes, wherein the one-dimensional head signal sensing information comprises sensing information of a first head signal and a third head signal, wherein the first head signal is emitted by the tip electrode, the third head signal is emitted by the one or more ring electrodes, the touch sensitive processing method further comprises: calculating two approaching or touching positions of the ring electrodes and the one or more ring electrodes according to the head signal sensing image; calculating a projected direction of the active stylus according to the two approaching or touching positions; and calculating a tilt angle between the active stylus and the touch panel according to the two approaching or touching positions and an arrangement between the tip electrode and the one or more ring electrodes.

Preferably, in order to save cost and power, to improve fall-resistance and shock-resistance, wherein the driving circuit comprises components for one single channel, the sensing circuit module is configured to sense the first head signal during a first head signal period of the head signal period, the sensing circuit module is configured to sense the third head signal during a third head signal period of the head signal period.

According to an embodiment of the present application, a touch sensitive processing apparatus which is applicable to a touch panel is provided. The touch panel comprises multiple first electrodes in parallel to a first axis and multiple second electrodes in parallel to a second axis. The touch sensitive processing apparatus comprising: an interconnection network module for connecting the first electrodes and the second electrodes, respectively; a driving circuit module for providing driving signal; a sensing circuit module for sensing electrical signals; and a processor module for executing instructions stored in a non-volatile memory to realize: having the interconnection network module connect the driving circuit module to the first electrodes; having the driving circuit module emit beacon signal; having the interconnection network connect the sensing circuit module with the first and the second electrodes; during a tail signal period, having the sensing circuit detect tail signal via the second electrodes and the first electrodes to gather a first-axis tail signal sensing information and a second-axis tail signal sensing information; during a head signal period, having the sensing circuit detect tail signal via the second electrodes and the first electrodes to gather a first-axis head signal sensing information and a second-axis head signal sensing information; and calculating an approaching or touching position of the active stylus and a touching end information related to which one of a head end and a tail end of the active stylus approaching or touching the touch panel according to the first-axis tail signal sensing information, the second-axis tail signal sensing information, the first-axis head signal sensing information, and the second-axis head signal sensing information.

Preferably, in order to save cost and power, to improve fall-resistance and shock-resistance, and to avoid synchronization issue of having two receiving channels, wherein the tail signal period and the head signal period are adjacent to each other, and no guard period is in between.

Preferably, in order to provide pressure information to touch sensitive processing apparatus, wherein the one-dimensional head signal sensing information comprises sensing information of a first head signal and a second head signal, signal strength of the second head signal is corresponding to a pressure on a force sensing component installed in a head end of the active stylus, wherein the processor module is further configured for calculating a value of the pressure according to signal strengths of the first head signal and the second head signal.

Preferably, in order to save cost and power, to improve fall-resistance and shock-resistance, the driving circuit of the active stylus comprises components for one single channel, wherein the sensing circuit module sense the first head signal during a first head signal period of the head signal period, and the sensing circuit module sense the second head signal during a second head signal period of the head signal period.

Preferably, in order to provide additional information to touch sensitive processing apparatus, wherein the head electrode comprises a tip electrode and one or more ring electrodes, wherein one of the ends of the active stylus are surround by the one or more ring electrodes, wherein the one-dimensional head signal sensing information comprises sensing information of a first head signal and a third head signal, wherein the first head signal is emitted by the tip electrode, the third head signal is emitted by the one or more ring electrodes, wherein the processor module is further configured for: calculating two approaching or touching positions of the ring electrodes and the one or more ring electrodes according to the head signal sensing image; calculating a projected direction of the active stylus according to the two approaching or touching positions; and calculating a tilt angle between the active stylus and the touch panel according to the two approaching or touching positions and an arrangement between the tip electrode and the one or more ring electrodes.

Preferably, in order to save cost and power, to improve fall-resistance and shock-resistance, wherein the driving circuit comprises components for one single channel, the sensing circuit module is configured to detect the first head signal during a first head signal period of the head signal period, the sensing circuit module is configured to detect the third head signal during a third head signal period of the head signal period.

According to an embodiment of the present application, a touch sensitive processing method for a touch sensitive apparatus which is applicable to a touch panel is provided. The touch panel comprises multiple first electrodes in parallel to a first axis and multiple second electrodes in parallel to a second axis. The touch sensitive processing method comprising: having an interconnection network module of the touch sensitive processing apparatus connect the driving circuit module to the first electrodes; having a driving circuit module of the touch sensitive processing apparatus emit beacon signal; having the interconnection network connect the sensing circuit module with the first and the second electrodes; during a tail signal period, having the sensing circuit sense tail signal via the second electrodes and the first electrodes to gather a first-axis tail signal sensing information and a second-axis tail signal sensing information; during a head signal period, having the sensing circuit sense tail signal via the second electrodes and the first electrodes to gather a first-axis head signal sensing information and a second-axis head signal sensing information; and calculating an approaching or touching position of the active stylus and a touching end information related to which one of a head end and a tail end of the active stylus approaching or touching the touch panel according to the first-axis tail signal sensing information, the second-axis tail signal sensing information, the first-axis head signal sensing information, and the second-axis head signal sensing information.

Preferably, in order to save cost and power, to improve fall-resistance and shock-resistance, and to avoid synchronization issue of having two receiving channels, wherein the tail signal period and the head signal period are adjacent to each other, and no guard period is in between.

Preferably, in order to provide pressure information to touch sensitive processing apparatus, wherein the one-dimensional head signal sensing information comprises sensing information of a first head signal and a second head signal, signal strength of the second head signal is corresponding to a pressure on a force sensing component installed in a head end of the active stylus, wherein the touch sensitive processing method further comprises: calculating a value of the pressure according to signal strengths of the first head signal and the second head signal.

Preferably, in order to save cost and power, to improve fall-resistance and shock-resistance, the driving circuit of the active stylus comprises components for one single channel, wherein the sensing circuit module sense the first head signal during a first head signal period of the head signal period, and the sensing circuit module sense the second head signal during a second head signal period of the head signal period.

Preferably, in order to provide additional information to touch sensitive processing apparatus, wherein the head electrode comprises a tip electrode and one or more ring electrodes, wherein one of the ends of the active stylus are surround by the one or more ring electrodes, wherein the one-dimensional head signal sensing information comprises sensing information of a first head signal and a third head signal, wherein the first head signal is emitted by the tip electrode, the third head signal is emitted by the one or more ring electrodes, wherein the touch sensitive processing method further comprises: calculating two approaching or touching positions of the ring electrodes and the one or more ring electrodes according to the head signal sensing image; calculating a projected direction of the active stylus according to the two approaching or touching positions; and calculating a tilt angle between the active stylus and the touch panel according to the two approaching or touching positions and an arrangement between the tip electrode and the one or more ring electrodes.

Preferably, in order to save cost and power, to improve fall-resistance and shock-resistance, wherein the driving circuit comprises components for one single channel, the sensing circuit module is configured to sense the first head signal during a first head signal period of the head signal period, the sensing circuit module is configured to sense the third head signal during a third head signal period of the head signal period.

According to an embodiment of the present application, a touch system is provided. The touch system comprising the touch panel and the touch sensitive processing apparatus. Preferably, the touch system further comprises abovementioned active stylus.

The active stylus provided by the present application does not bother to determine which one of the head electrode and the tail electrode received the beacon signal emitted from the touch panel. It can equip the sensing circuit with a single channel to detect the beacon signal to save cost and power in order to improve fall-resistance and shock-resistance. Besides, the active stylus can utilize the driving circuit with a single channel to emit electrical signals corresponding to the beacon signal in a time-sharing manner. The touch sensitive processing apparatus of the touch panel can determine an approaching or touching position and a touching end information according to the received signals during the head signal period and the tail signal period after the beacon signal. Based on different touching end information, the touch system may respond differently. For example, the active stylus touching with its tail end can be used to erase. When the electrical signals transmitted during multiple head signal periods by the active stylus, it can carry information with regard to pressure, projected direction, tilt angle and etc. to the touch sensitive processing apparatus.

Person having ordinary skill in the art can understand that the head signal or the tail signal may be modulated differently for representing status of one or more buttons of the active stylus in other embodiments of the present application. For example, when the button is pressed, the tail signal may be generated according to a first modulation. When the button is not pressed, the tail signal may be generated according to a second modulation. The sensing circuit module of the touch sensitive processing apparatus may determine the status of the button according to the modulation of the tail signal received in the tail signal period.

BRIEF DESCRIPTION OF THE DRAWINGS

The advantages and spirit related to the present invention can be further understood via the following detailed description and drawings.

DETAILED DESCRIPTION OF THE PREFERRED EMBODIMENT

Figure 1:
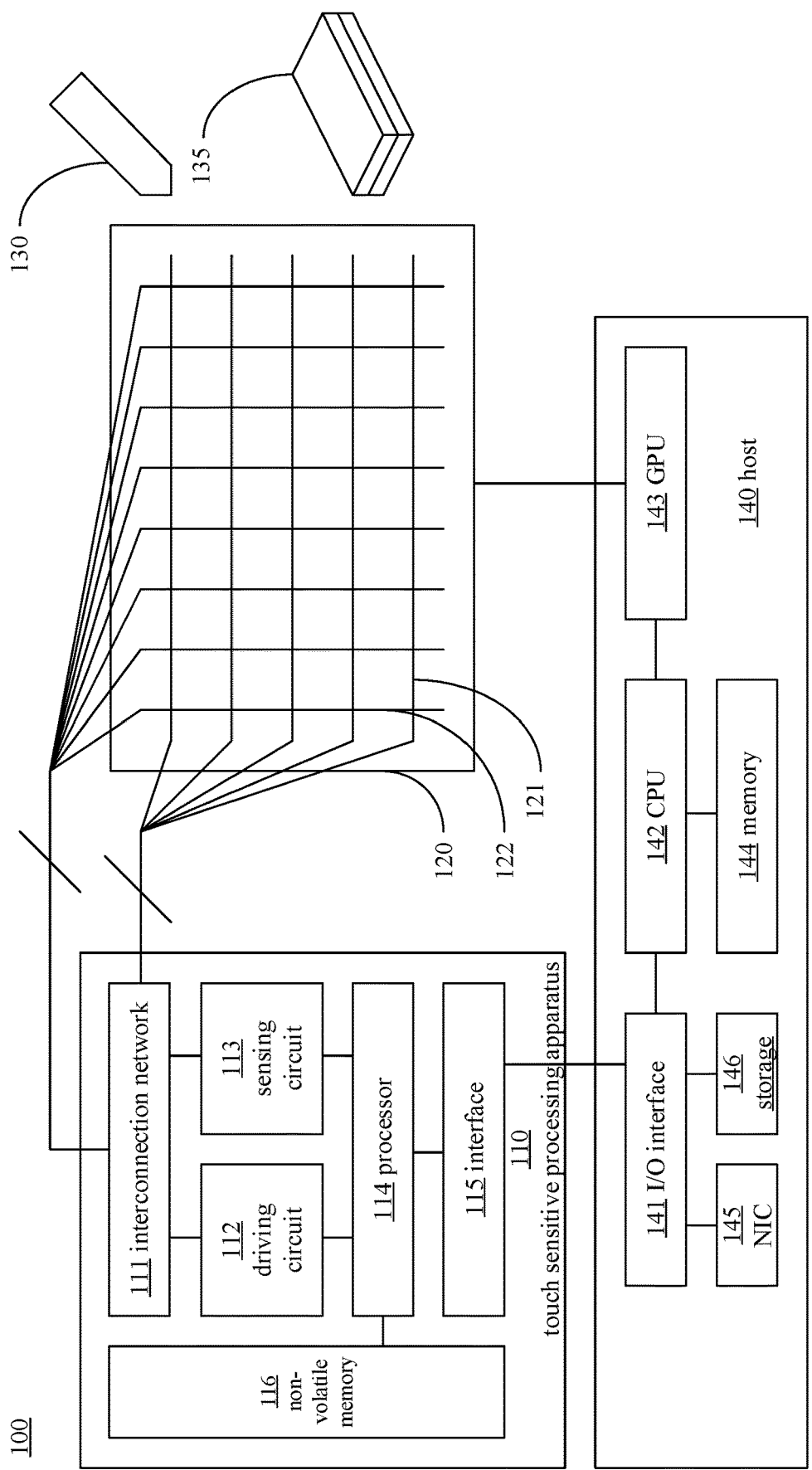
FIG. 1 is a block diagram of a touch system 100 according to an embodiment of the present application.

Some embodiments of the present application are described in details below. However, in addition to the description given below, the present invention can be applicable to other embodiments, and the scope of the present invention is not limited by such rather by the scope of the claims. Moreover, for better understanding and clarity of the description, some components in the drawings may not necessary be drawn to scale, in which some may be exaggerated related to others, and irrelevant. If no relation of two steps is described, their execution order is not bound by the sequence as shown in the flowchart diagram.

The terms "first", "second", "third" and etc. recited in the specification, claims and drawings of the instant application are used to distinguish similar objects, not to specify a sequence or an order. It may be understood that the objects being described in that manner can be interchangeable under appropriate circumstances. In the specification of the instant application, the meaning of "a plurality" explicitly refers to two or more, unless they are specifically defined. In addition, the terms "comprise" and "include" and any other equivalents of these terms are intended to be non-exclusively. Some blocks as shown in the drawings may be functional entities, which may not directly correspond to physical or logical entities. The function entities may be implemented in a form of software, in one or more hardware circuits or integrated circuits, or in different networks, different processor devices or different micro controllers.

In the description of the instant application, it is noted that the terms "installed", "coupled" and "connecting" should be interpreted in the broadest reasonable way, unless they are otherwise defined or limited explicitly. For examples, two may be fixed connected, attachable connected, or jointly connected; mechanically connected, electrically coupled, or communicably connected; directly connected or indirectly connected via intermediates; or interconnected inside the two components or interactively correspondence of the two components. For persons having ordinary skill in the art, he/she can understand what the terms mean substantially in the specification based on the circumstances.

In order to make the purpose, features and advantages of the present application more obvious and easier to understand, below in conjunction with the figures and the specific embodiments are described in further detail to the present application.

Please refer to FIG. 1, which depicts a block diagram of a touch system 100 in accordance with an embodiment of the present application. The touch sensitive system 100 may be a common desktop, laptop, tablet personal computer, industrial control computer, smartphone or any other computer system fulfilling touch sensitive functions.

The touch system 100 may comprise a touch sensitive processing apparatus 110, a touch panel or screen 120 which connects to the touch sensitive processing apparatus 110, and a host 140 which connects to the pressure sensitive processing apparatus 110. The touch system 100 may further comprise one or more styli 130 and/or one or more touch board erasers 135. Hereinafter the present application, the touch panel or screen 120 may be referred as touch screen 120. However, in the embodiments which are lack of display functionality, person having ordinary skill in the art can understand the so-called touch screen is a touch panel per se.

The touch screen 120 comprises multiple first electrodes 121 in parallel to a first axis and multiple second electrodes 122 in parallel to a second axis. The first electrodes 121 intersect with the second electrodes 122 to form multiple sensing points or areas. Similarly, the second electrodes 122 intersect with the first electrodes 122 to form multiple sensing points or areas. In some embodiments, the first electrodes 121 may be referred to as first touch electrodes 121; the second electrodes 122 may be referred to as second touch electrodes 122. Collectively, the first electrodes 121 and the second electrodes 122 are referred to as touch electrodes. In some embodiments involving the touch screen 120, the first electrodes 121 and the second electrodes 122 are made of transparent materials. The first electrodes 121 and the second electrodes 122 may be in the same electrode layer where conductive plates of each of the first electrodes 121 or the second electrodes 122 are connected by bridging. The first electrodes 121 and the second electrodes 122 may be disposed in two overlapping electrode layers. Unless described specifically, the present application may be applicable to the embodiments include single electrode layer and the embodiments include multiple electrode layers. The first axis and the second axis are usually perpendicular to each other. However, the present application does not limit that the first axis must be perpendicular to the second axis. In one embodiment, the first axis may be a horizontal axis or a refresh axis of the touch screen 120. The first electrodes 121 and/or the second electrodes 122 may include multiple conductive plates. Person having ordinary skill in the art may refer to multiple patent applications of the Applicant to understand various embodiments of the first electrodes 121 and/or the second electrodes 122.

The touch sensitive processing apparatus 110 may comprise following hardware circuit modules: an interconnection network module 111, a driving circuit module 112, a sensing circuit module 113, a processor module 714, an interface module 115, and non-volatile memory 116. The touch sensitive processing apparatus 110 may be implemented in a single chip of integrated circuits, which may encapsulate one or more dies. The touch sensitive processing apparatus 110 may be implemented by multiple chips of integrated circuits and a circuit board connecting these chips. The touch sensitive processing apparatus 110 may be implemented in the same chip which comprise the host 140. In other words, the application does not limit how the touch sensitive processing apparatus 110 implements.

The interconnection network module 111 is configured to connect one or more first electrodes 121 and/or the second electrodes 122 of the touch screen 120, respectively. The interconnection network module 111 may receive control commands of the processor module 114 for connecting the driving circuit module 112 with any one or more touch electrodes and for connecting the sensing circuit module 113 with any one or more touch electrodes. The interconnection network module 111 may comprise a combination of one or more multiplexers to fulfill the mentioned functions.

The driving circuit module 112 may comprise clock generator, frequency divider, frequency multiplier, phase lock loop, power amplifier, DC-DC voltage converter, regulator and/or filter, which is configured to provide driving signal to any one or more touch electrodes via the interconnection network module 111 according to control commands of the processor module 114. The driving signal may be modulated by kinds of analog or digital modulations for carrying some messages. The modulations include but not limit to frequency modulation (FM), phase modulation, amplitude modulation, dual sideband modulation (DSB), single sideband module (SSB-AM), vestigial sideband modulation, amplitude shift keying (ASK), phase shift keying (PSK), quadrature amplitude modulation (QAM), frequency shift keying (FSK), continuous phase modulation (CPM), code division multiple (CDMA), time division multiple access (TDMA), orthogonal frequency division multiplexing (OFDM), pulse width modulation (PWM) and etc. The driving signal may include one or more square waves, sinuous waves, or any modulated waves. The driving circuit module 112 may include one or more channel. Each channel may be connected to any one or more touch electrodes via the interconnection network module 111.

The sensing circuit module 113 may comprise integrator, sampler, clock generator, frequency divider, frequency multiplier, phase lock loop, power amplifier, operational amplifier, DC-DC voltage converter, regulator and/or filter, which is configured to sense on any one or more touch electrodes via the interconnection network module 111 according to control commands of the processor module 114. When the touch signal is transmitted from one of the touch electrodes, another touch electrode may induce the touch signal. And the sensing circuit module 113 may demodulate the induced touch signal by another touch electrode in accordance with the modulation method performed on the driving signal by the driving circuit module 112 in order to restore the messages carried by the driving signal. The sensing circuit module 113 may include one or more channels. Each channel may be connected to any one or more touch electrodes via the interconnection network module 111. At the same time, each channel may simultaneously perform sensing and demodulation.

In one embodiment, the driving circuit module 112 and the sensing circuit module 113 may include analog front-end (AFE) circuits. In another embodiment, in additional to the AFE circuits, the driving circuit module 112 and the sensing circuit module 113 may include digital back-end (DBE) circuits. If the driving circuit module 112 and the sensing circuit module 113 include only the AFE circuits, the DBE circuits may be implemented in the processor module 114.

The processor module 114 may include a digital signal processor for connecting the AFE circuits or the DBE circuits of the driving circuit module 112 and the sensing circuit module 113, respectively. The processor module 114 may include an embedded processor, non-volatile memories, and volatile memories. Normal or real-time operating system (OS) and their application programs may be stored in the non-volatile memories. The OS and the application programs include multiple instructions and data. The processor (including the embedded processor and the digital signal processor) may execute the instructions for controlling other modules including the interconnection network module 111, the driving circuit module 112, the sensing circuit module 113 and the interface module 115 of the pressure sensitive processing apparatus 110. For examples, the processor module 114 may comprises processors widely adopted in the industry such as 8051 series, Intel i960 series, ARM Cortex-M series and etc. The present application does not limit types and numbers of processor cores included in the processor module 114.

The instructions and data may be used to implement each of steps mentioned in the present application and flows and methods constructed by the steps. Some instructions may be executed independently inside the processor module 114, for examples, arithmetic and log operation instructions. Other instructions may be used to control other circuits of the touch sensitive processing apparatus 110. These instructions may include input/output interfaces of the processor module 114 to control other circuits. Other circuits may provide information via the input/output interface of the processor module 114 to the OS and/or application programs executed by the processor module 114. Persons having ordinary skill in the art should have common knowledge of computer organization and architecture which enabling them to understand that the flows and methods provided by the present application can be realized by the circuits and the instructions.

The interface module 115 may include kinds of serial or parallel bus, such as universal serial bus (USB), I2C, peripheral component interconnect (PCI), PCI-Express, IEEE 1394 and other industrial standard input/output interface. The touch sensitive processing apparatus 110 connects to the host 140 via the interface module 115.

The non-volatile memory 116 may include readable and writable memory such as EEPROM or flash memory. Content in the memory can be preserved when power is lost. The processor module 114 can load and execute firmware stored in the non-volatile memory 116 for realizing touch sensitive functionalities. The firmware may include a real-time operating system, instructions, and program for the operations of the processor module 114. In one embodiment, the program and data in the firmware enables the touch sensitive processing apparatus 110 to implement the embodiments provided by the present application.

The touch system 100 may include one or more styli 130 and/or touch board erasers 135. The stylus or the touch board eraser 135 may be a transmitter which emits electrical signals. It may be a transmitter which actively emits electrical signals or a passive transmitter which passively emits electrical signals, or a responsive transmitter which transmits electrical signals in response to external electrical signals. The stylus 130 or touch board eraser 135 may include one or more electrodes for synchronously or asynchronously receiving electrical signals from the touch screen 120 or for synchronously or asynchronously transmitting electrical signals to the touch screen 120. The electrical signals may be modulated in one or more the modulations provided above.

The stylus 130 or the touch board eraser 135 may include a conductor which is supposed to transmit driving signals to ground via a user's hand or body. The stylus 130 or the touch board eraser 135 may connect to the input/output interface module 141 or other modules connected to the input/output interface module 141 wirelessly or by wire.

The touch sensitive processing apparatus 110 can detect one or more external conductive objects such as human fingers, palms, passive styli 130 or touch board erasers 135 via the touch screen 120. It can also detect a stylus 130 or a touch board eraser 135 which transmits electric signals. The touch sensitive processing apparatus 110 can use mutual-capacitance or self-capacitance principles to detect the external conductive objects. The touch stylus 130, the touch board eraser 135 and the touch sensitive processing apparatus 110 can utilize the electrical signals to carry messages by taking advantage of the signal modulations and demodulations. The touch sensitive processing apparatus 110 can detect one or more approaching or touching positions of the stylus 130 or the touch board eraser 135 on the touch screen 120, status of sensors (e.g., pressure sensor or button) onboard the stylus 130 or the touch board eraser 135, a direction of the stylus 130 or the touch board eraser 135, or a tilt angle between the surface of the touch screen 120 and the stylus 130 or the touch board eraser 135 by the electrical signals from the stylus 130 or the touch board eraser 135.

The host 140 is a main apparatus for controlling the touch system 100. It may comprise an input/output interface module 141 for connecting the interface module 115, a central processing unit (CPU) module 142, a graphics processor module 143, a memory module 144 connects to the CPU module 142, a network interface module 145 and a storage module 146 connect to the input/output interface module 141.

The storage module 146 comprises non-volatile memory. Common examples are hard disks, electronic erasable rewritable read only memory (EEPROM), or flash memory. The storage module 146 may store a normal operating system and application programs executable under the operating system. The network interface module 145 may comprise wired or wireless hardware network interface. The network interface module 145 may be compliant to common industrial standards such as IEEE 802.11 Wireless Local Area Network, IEEE 802.3 Local Area Network, 3G, 4G and/or 5G wireless telecommunication standards, Bluetooth wireless communication standards, and etc.

The CPU module 142 may directly or indirectly connects to the input/output interface module 141, the graphics processor module 143, the memory module 144, the network interface module 145 and the storage module 146. The CPU module 142 may comprise one or more processor or processor cores. Common processors may include Intel, AMD, VIA's x86 and x64 instruction set architecture (ISA) processors, Apple, Qualcomm, MediaTek's ARM ISA processors, or any other types of complex instruction set computer (CISC) or reduced instruction set computer (RISC) processors. The OS and application programs include multiple instructions and data corresponding to the instruction set. By executing these instructions, the CPU module 142 is able to control other modules of the touch system 100.

The optional graphics processor (GPU) module 143 is usually configured to handle computations with respect to graphics outputs. The graphics processor module 143 may connect to the touch screen 120 for controlling outputs of the touch screen 120. In some applications, the host 140 may have the CPU module 142 execute the computations with respect to graphics outputs, without dedicated handling of the graphics processor module 143.

The host 140 may comprise components or apparatus not shown in FIG. 1, for example, audio input/output interface, keyboard input interface, mouse input interface, track-ball input interface and/or any other hardware circuits. Persons having ordinary skill in the art should have common knowledge of computer organization and architecture. They can understand the touch system 100 disclosed by the present application is exemplary. Parts regarding to the inventive feature provided by the present application should be referred to the specification and the claim.

In the mutual-capacitance sensing, the driving circuit module 112 provides driving signals to one of the first electrodes 121 in a time-sharing manner. While the driving signals being provided in multiple occasions, the sensing circuit module 113 is required to perform multiple sensing on all the second electrodes 122 simultaneously in order to gather sensing information in multiple one-dimensional sensing arrays. Each of the one-dimensional sensing arrays comprises sensing results corresponding to each of the second electrodes 122. The multiple one-dimensional sensing arrays can form a two-dimensional array of sensing information or a sensing image according to a sequence of the first electrodes 121 which emitted the driving signals. According to the two-dimensional array of sensing information or the sensing image, the processor module 114 can detect whether there is an external conductive object approaching or touching the touch screen 120.

The stylus 130 may be an active stylus. The shape of the stylus 130 may be a pen or a long rod which can be hold by a human hand. The stylus 130 has two opposite ends. In the present application, the shape of a first end is shaper and/or slender than a second end. The first end may be referred to as head or head end. The second end may be referred to as tail or tail end.

Figure 2:
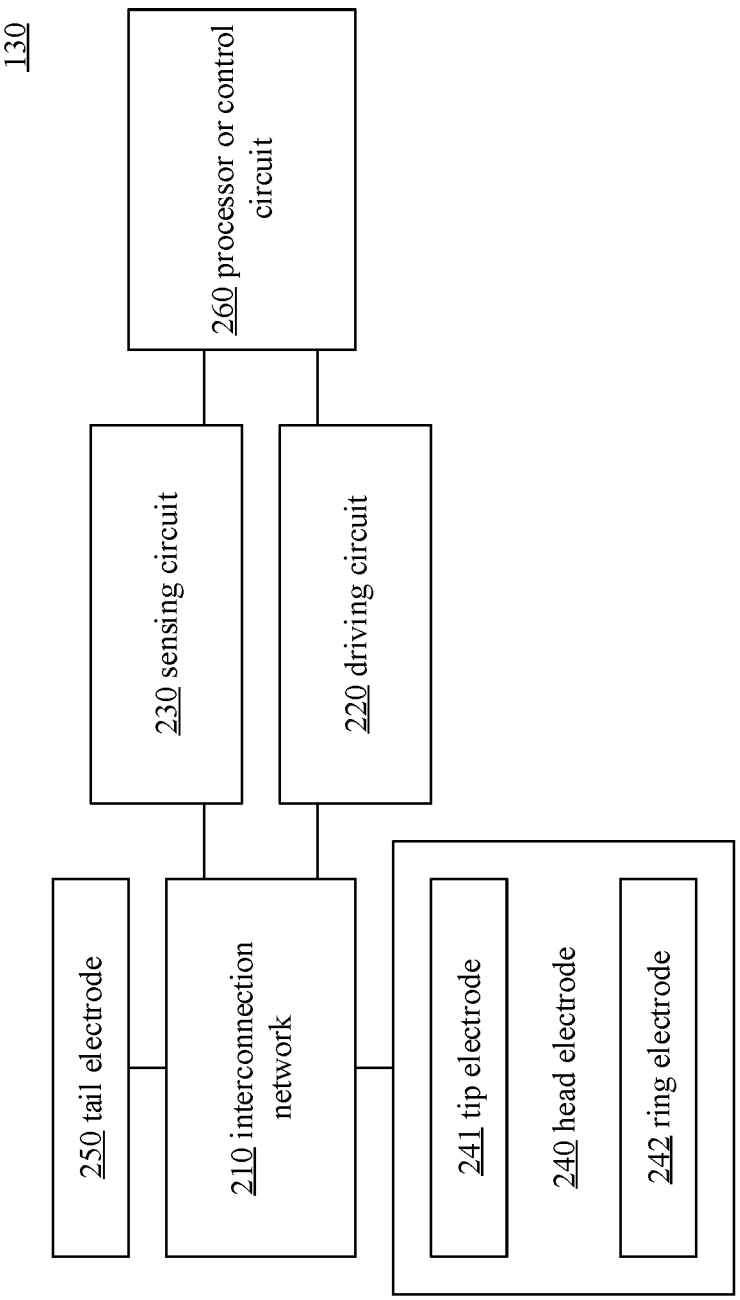
FIG. 2 shows a block diagram of a stylus 130 according to an embodiment of the present application.

Please refer to FIG. 2, which shows a block diagram of a stylus 130 according to an embodiment of the present application. The head end of the stylus 130 may comprise one or more head electrodes 240. The tail end of the stylus 130 may also comprise one or more tail electrodes 250. The head electrodes 240 and the tail electrodes 250 may collectively called stylus electrodes. The stylus electrodes are connected to a processing circuit of the stylus 130. After receiving beacon signals came from touch electrodes of touch panel or screen 120 via the stylus electrodes, the processing circuit may emit electrical signals to the touch electrodes of the touch panel or screen 120 via the stylus electrodes. Therefore, a touch sensitive processing apparatus coupled to the touch panel or screen can analyze the electrical signals to calculate a position where the stylus 130 approaching or touching the touch panel or screen 120. Furthermore, the touch sensitive processing apparatus can tell which one of the head and the tail ends of the stylus 130 approaching or touching the touch panel or screen 120. In case there are multiple head electrodes 240, e.g., a tip electrode 241 and one or more ring electrodes 242 behind the tip electrode 241, the touch sensitive processing apparatus 110 can determine a projected direction of the stylus 130 on a surface of the touch panel or screen 120 and an angle (or a tilt angle) between the stylus 130 and the surface of the touch panel or screen 120 according to multiple positions corresponding to the multiple head electrodes, respectively.

As shown in FIG. 2, the stylus 130 may include an interconnection network 210, a driving circuit 220, a sensing circuit 230, a processor or control circuit 260. The embodiments and their variants of the interconnection network module 111 of the touch sensitive processing apparatus 110 may be applied to the interconnection network 210. The embodiments and their variants of the driving circuit module 112 of the touch sensitive processing apparatus 110 may be applied to the driving circuit 220. The embodiments and their variants of the sensing circuit module 113 of the touch sensitive processing apparatus 110 may be applied to the sensing circuit 230. The embodiments and their variants of the processor module 114 of the touch sensitive processing apparatus 110 may be applied to the processor or control circuit 260.

The stylus 130 may further comprise a battery and an electricity distribution module unshown in FIG. 2 for providing electricity to abovementioned components. The battery may include a rechargeable battery, a one-time battery, a capacitor, and/or a supercharged capacitor. When the battery is a rechargeable battery or capacitor, the stylus 130 may further include a recharging circuit. Because the volume and the weight of the stylus 130 are very limited, the capacity of the battery is also limited. Hence, it is required to reduce the complexity of the circuits of the stylus 130 such that the power consumption of the stylus 130 can be reduced and the endurance can be improved as a result. Meanwhile, the resistance of the stylus 130 to falling and shacking can be also increased. And the cost of the stylus 130 can be also reduced.

In one embodiment, the sensing circuit 230 may comprise components for one single channel. In other words, the sensing circuit 230 can only receive a single signal source at any given time for determining whether the received signal is the beacon signal or the driving signal for synchronization. In this embodiment, user can place the head or the tail approaching or touching the touch panel or screen 120. Hence, the processor or control circuit 260 may have the interconnection network 210 connecting each the stylus electrodes and the sensing circuit 230. As a result, no matter whether the head or the tail approaching or touching the touch panel or screen 120, the sensing circuit 230 is able to detect the beacon signal or driving signal for synchronization.

In one embodiment, the driving circuit 220 may comprise components for only one signal channel. In other words, the driving circuit 220 can emit electrical signals or driving signals in one single modulation at any given time. In this embodiment, user can place the head or the tail approaching or touching the touch panel or screen 120. Hence, after the beacon signal or driving signal for synchronization is received by the sensing circuit 230, the processor or control circuit 260 may have the interconnection network 210 connecting each the stylus electrodes with the driving circuit 220 in turns. As a result, no matter whether the head or the tail approaching or touching the touch panel or screen 120, the driving circuit 220 can emit electrical signal via each the stylus electrodes in turns. The touch sensitive processing apparatus 110 can receive the electrical signal to calculate information such as an approaching or touching position, a touching end information related to which one of the head and the tail approaching or touching, a pressure on the head end of the stylus, a projected direction of the stylus, and a tilt angle of the stylus.

In one embodiment, the processor or control circuit 260 may include a processor for executing instructions stored in non-volatile memory for fulfilling the embodiments provided by the present application. In an alternative embodiment, the processor or control circuit 260 may comprise no processors but customized control logic circuits which can be used to fulfill the embodiments provided by the present application. In other embodiments, it may comprise a processor such as Application-Specified Integrated Circuits (ASIC) and/or Field Programmable Gate Array (FPGA) for realizing customized control logics or algorithms.

Figure 3:
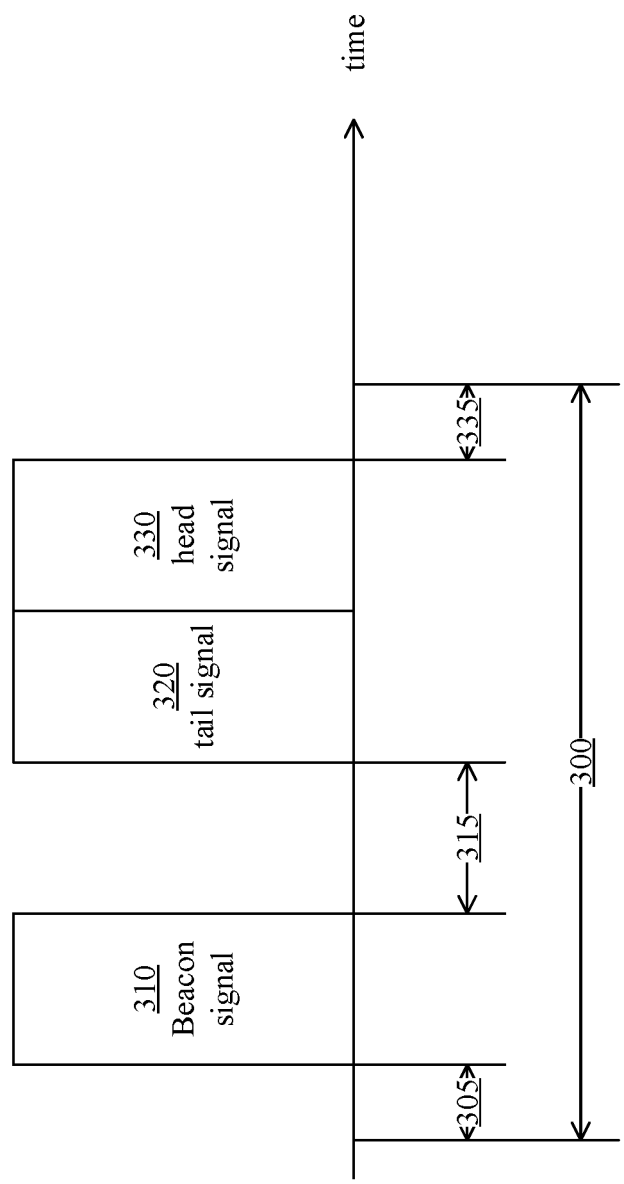
FIG. 3 depicts a timing sequence diagram of a stylus signal period 300 according to an embodiment of the present application.

Please refer to FIG. 3, which illustrates a timing sequence diagram of a stylus signal period 300 in accordance with an embodiment of the present application. The stylus signal period 300 as shown in FIG. 3 comprises a beacon signal period 310, a tail signal period 320 and a head signal period 330 after the beacon signal period 310. Although in the embodiment as shown in FIG. 3, the tail signal period 320 is prior to the head signal period 330, the present application does not limit the sequence order of the tail signal period 320 and the head signal period 330. It only requires that they are both after the beacon signal period 310. In one embodiment, because the driving circuit 220 comprises components for only one signal channel, there may be no turnaround or guard time period between the tail signal period 320 and the head signal period 330.

Prior to the beacon signal period 310, the beginning of the stylus signal period 300 may comprise a first guard period 305. The end of the stylus signal period 300 may comprise a third guard period 335. In one embodiment, when multiple continuous stylus signal periods 300 are arranged, the third guard period 335 of a previous stylus signal period 300 is concatenated to the first guard period 305 of a later stylus signal period 300 such that a continuous guard period is formed for separating these two stylus signal periods 300. In an alternative embodiment, when the stylus signal period 300 follows or leads a finger detection period or a board eraser detection period, the first guard period 305 and the third guard period 335 are used to separate the finger detection period or the board eraser detection period from the stylus signal period 300.

A second guard period 315 may be rested after the beacon signal period 310 and prior to the tail signal period 320 and the head signal period 330. In the second guard period 315, the processing circuit of the stylus 130 can determine whether the beacon signal is received during the beacon signal period 310 and set up the interconnection network 210. The touch sensitive processing apparatus 110 may be aware of the lengths of the first guard period 305, the second guard period 315, and the third guard period 335 so as that the sensing is performed during the tail signal period 320 and the head signal period 330 after the beacon signal or the driving signal is emitted during the beacon signal period 310.

In one embodiment, the tail signal and the head signal emitted from the driving circuit 220 may be PWM signals with different duty cycles, respectively, or electrical signals with different frequencies, respectively. In this embodiment, the pulse strengths of the tail signal and the head signal may be the same. In an alternative embodiment, the tail signal and the head signal may be PWM signals with identical duty cycle or electrical signals with identical frequency. The touch sensitive processing apparatus 110 may determine which one of the tail or the head approaching or touching the touch panel or screen 120 according to accumulated signal strengths of the tail signal and the head signal. For example, when the accumulated signal strength of the tail signal is far larger than the accumulated signal strength of the head signal, it can be determined that it is the tail approaching or touching the touch panel or screen 120.

In this embodiment, the sensing circuit 230 comprises only one channel of receiving circuit. The driving circuit 220 also comprises only one channel of transmitting circuit which emits electrical signals during different periods. Hence, during one stylus signal period 300, the touch sensitive processing apparatus 110 can receive the electrical signals to calculate an approaching or touching position and a touching end information.

In an alternative embodiment, the head may further comprise a force sensing component and a component with fixed resistance. The resistance of the force sensing component may reflect the pressure on the head end. For example, the force sensing component may be a force sensing capacitor or a force sensing resistor. The driving circuit 220 may provide a first signal with a first frequency or a first duty cycle and a second signal with a second frequency or a second duty cycle. The first signal may be propagated to the head electrode 240 via the component with fixed resistance. The second signal may be propagated to the head electrode 240 via the force sensing component. According to a ratio of signal strengths between the two frequencies or the two duty cycles during the head signal period 330, the touch sensitive processing apparatus 110 may receive the electrical signals from the head electrode 240 and calculate the information of pressure on the head end accordingly.

Figure 4:
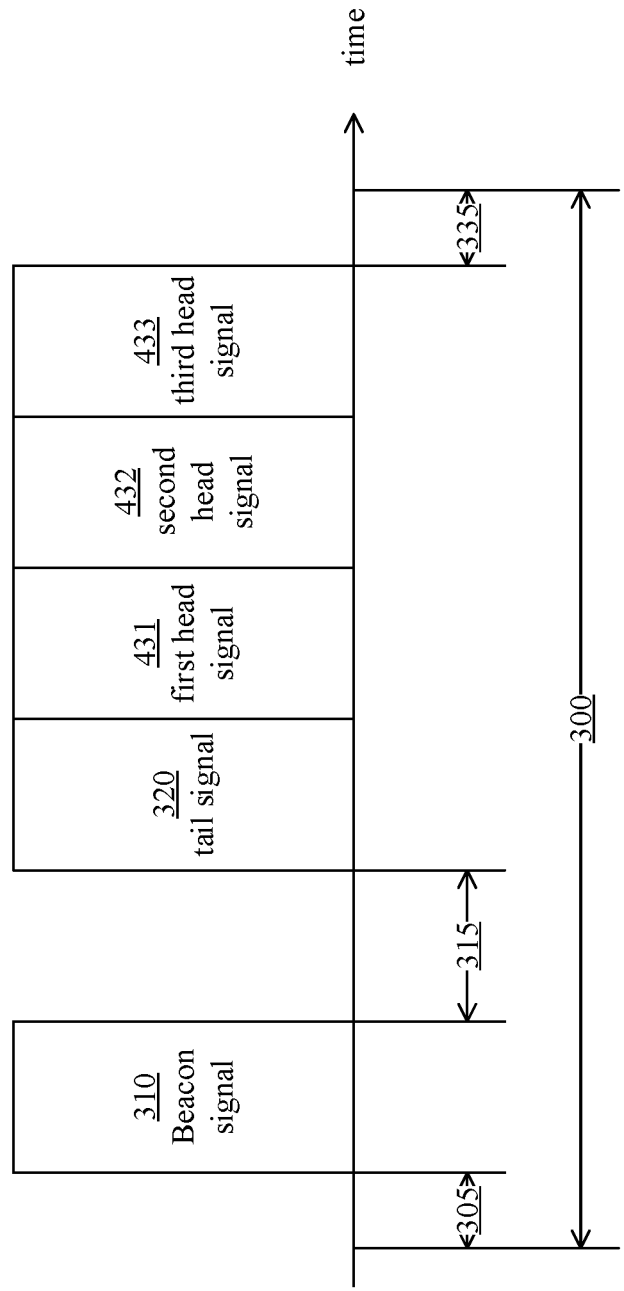
FIG. 4 shows a timing sequence of a stylus signal period 300 in accordance with another embodiment of the present application.

Please refer to FIG. 4, which shows a timing sequence of a stylus signal period 300 in accordance with another embodiment of the present application. Comparing with the embodiment as shown in FIG. 3, the difference resides that the head signal period 430 as shown in FIG. 4 may be further divided into a plurality of head signal periods such that a first head signal period 431, a second head signal period 432, and a third head signal period 433. People having ordinary skill in the art can understand that although three head signal periods are shown in FIG. 4, the stylus signal period may comprise two or more head signal periods.

In one embodiment, there may not exist any turnaround or guard period in between the plurality of head signal period and the tail signal period 320. The present application may not limit the sequence order of the tail signal period 320 and the plurality of head signal periods. It is only required that these periods are after the beacon signal period 310.

During the first head signal period 431, the driving circuit 220 may transmit the first signal with a first modulation (the first frequency or the first duty cycle). The first signal passes through the component with fixed resistance and propagates through the tip electrode 241. During the second head signal period 432, the driving circuit 220 may transmit the second signal with a second modulation (the second frequency or the second duty cycle). The second signal propagates through the force sensing component and the tip electrode 241. According to a ratio of signal strengths of the two modulated signals during the first head signal period 431 and the second head signal period 432, the touch sensitive processing apparatus 110 may calculate the information of pressure on the force sensing component installed in the head end. Hence, in a given period, the driving circuit 220 may only output a modulated signal with one frequency or one duty cycle. Thus the complexity of driving circuit 220 can be reduced.

During the third head signal period 433, the driving circuit 220 may transmit electrical signals via the one or more ring electrodes 242 installed in the head end. According to two approaching or touching locations corresponding to the tip electrode 241 and the ring electrodes 242, respectively, the touch sensitive processing apparatus 110 can determine a projected direction of the stylus and a tilt angle of the stylus. The signal strength during one or a combination of the plurality of head signal periods and the signal strength during the tail signal period 320 can be calculated. Based on their strengths, the touch sensitive processing apparatus 110 can determine which one of the head or the tail approaching or touching the touch panel or screen.

Figure 5:
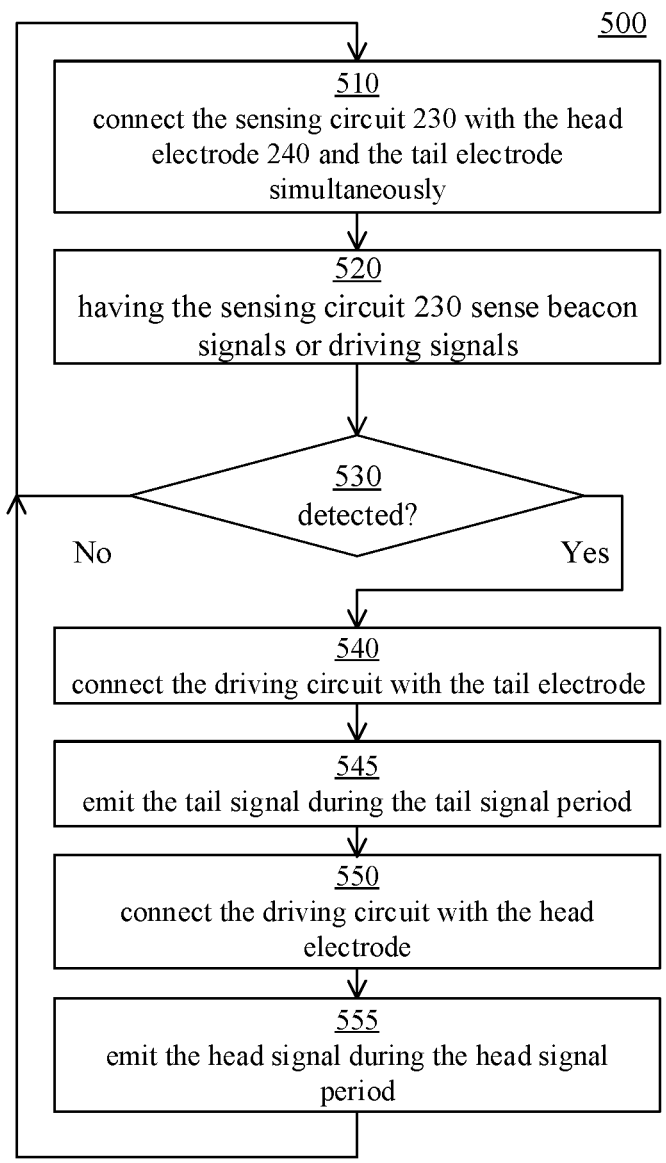
FIG. 5 depicts a flowchart diagram of a stylus processing method 500 in accordance with an embodiment of the present application.

Please refer to FIG. 5, which depicts a flowchart diagram of a stylus processing method 500 in accordance with an embodiment of the present application. The stylus processing method 500 may be realized by the stylus 130 as shown in FIG. 1 or in FIG. 2. In one embodiment, the stylus processing method 500 may be realized by the processor 260 executing the instructions stored in non-volatile memory. If there is no direct or indirect causal relationship between any two steps, the present application does not limit the sequence order of these two steps. The stylus processing method 500 may begin at step 510.

Step 510: having the interconnection network 210 connect the sensing circuit 230 with the head electrode 240 and the tail electrode simultaneously. The step 510 may be performed prior to the beacon signal period 310 or during the first guard period 305. In case that the stylus 130 has multiple head electrodes 240, e.g., the tip electrode 241 and ring electrodes 242. The step 510 may connect all or parts of the head electrodes 240 to the sensing circuit 230.

Step 520: having the sensing circuit 230 sense beacon signals or driving signals emitted from touch electrodes of the touch panel or screen 120. The step 520 may be performed during the beacon signal period 310. In one embodiment, the beacon signals or the driving signals are modulated specifically. The sensing circuit 230 is configured to detect the modulated signals for preventing interference.

Step 530: determining whether the beacon signals or the driving signals are detected. When the result is positive, the flow proceeds to step 540. When the result is negative, the flow may return to step 510. The step 530 may be performed during the second guard period 315.

Step 540: having the interconnection network 210 connect the driving circuit 220 with the tail electrode 250. Next, the flow may proceed to step 545.

Step 545: having the driving circuit 220 emit the tail signal during the tail signal period 320.

Step 550: having the interconnection network 210 connect the driving circuit 220 with the head electrode 240. Next, the flow may proceed to step 555.

Step 555: having the driving circuit 220 emit the head signal during the head signal period 330. After that, the flow may return to step 510.

In one embodiment, the head signal period 330 may comprises a plurality of head signal periods, for example as shown in FIG. 4. The driving circuit 220 may connect to different one of the head electrodes and emit different head signals during the plurality of head signal periods, respectively.

Figure 6:
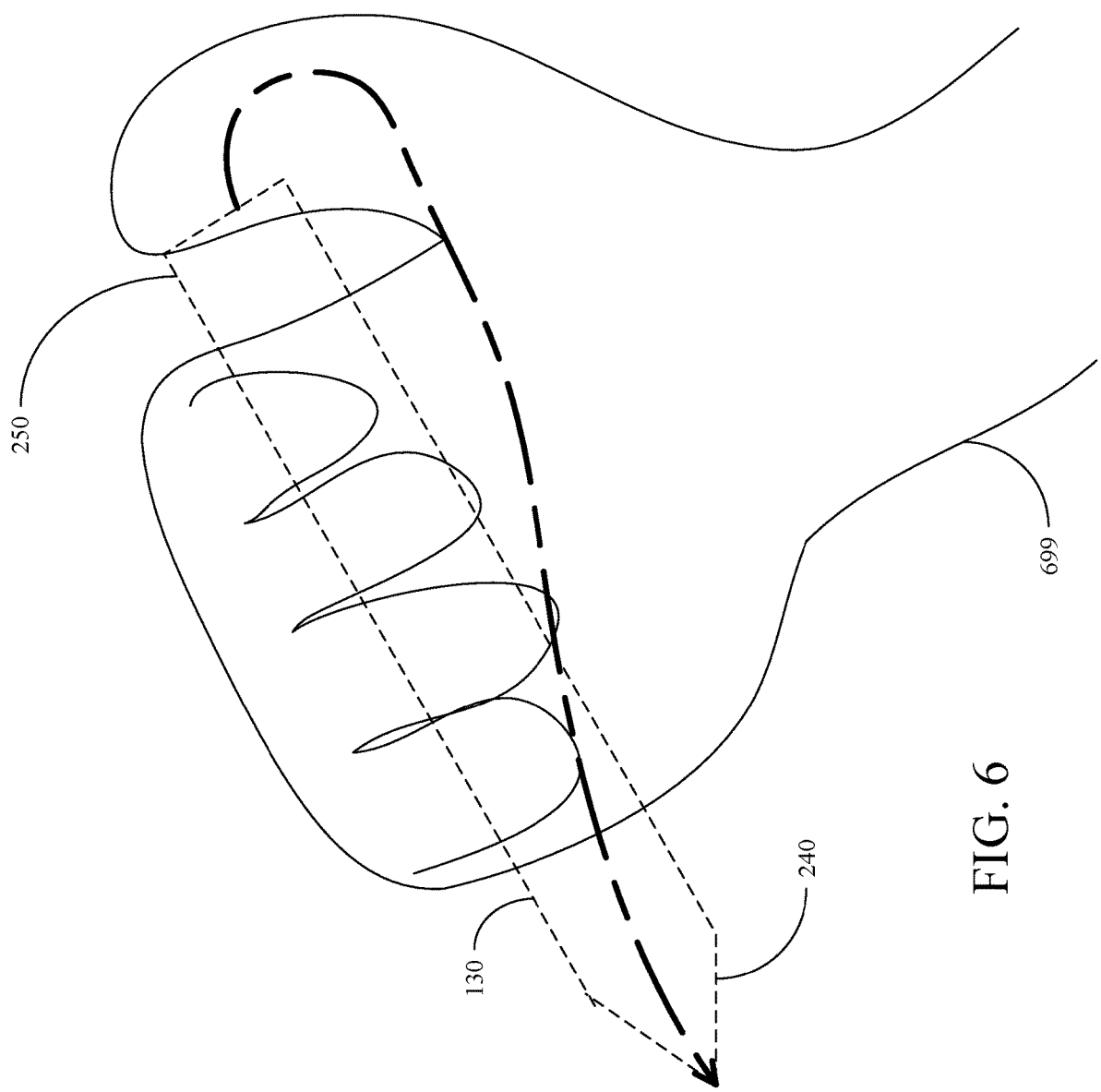
FIG. 6 depicts a hand of user holding a stylus 130.

Please refer to FIG. 6, which depicts a hand of user holding a stylus 130. A part of the hand 699 touches the tail electrode 250 of the stylus 130. Another part of the hand 699 touches the head electrode 240. At the step 540, the interconnection network 210 connects the driving circuit 220 with the tail electrode 250. Hence, during the tail signal period 320, the tail signal emitted from the tail electrode propagates through the hand 699 and the head electrode 240 to the touch panel or screen 120. As a result, despite the user places the head electrode 240 approaching or touching the touch panel or screen 120, the touch sensitive processing apparatus 110 may detect the tail signal during the tail signal period 320. Similarly, in case that the user places the tail electrode 250 approaching or touching the touch panel or screen 120, the touch sensitive processing apparatus 110 may receive the head signal during the head signal period. Thus, the touch sensitive processing apparatus 110 may determine which one of the tail or the head approaching or touching the touch panel or screen 120 which corresponding to a larger one of the received signal strengths of the tail signal and the head signal.

Figure 7:
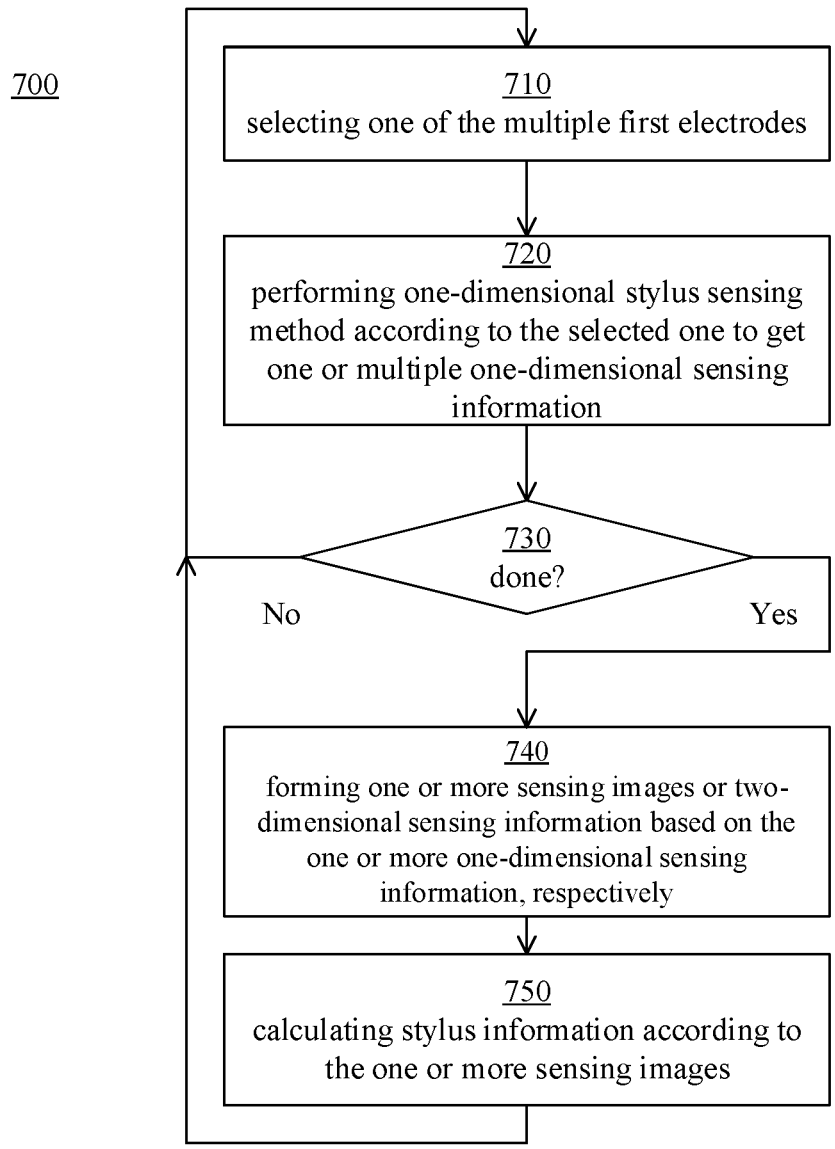
FIG. 7 depicts a flowchart diagram of a stylus sensing method 700 in accordance with an embodiment of the present application.

Please refer to FIG. 7, which depicts a flowchart diagram of a stylus sensing method 700 in accordance with an embodiment of the present application. The stylus sensing method 700 may be applied to the touch system 100 as shown in FIG. 1. The stylus sensing method 700 may be configured to sense multiple styli 130. In one embodiment, the stylus sensing method 700 may be embodied as the firmware stored in the non-volatile memory 116 as shown in FIG. 1. The firmware may comprise multiple instructions and data. The processor module 114 may execute the multiple instructions in the firmware to realize the stylus sensing method 700. In one embodiment, when the modulations of the one or more head signals and the tail signal emitted by the stylus 130 are different from the driving signal emitted by the touch sensitive processing apparatus 110, the stylus sensing method 700 may be performed concurrently with the sensing of external conductive objects (e.g., fingers and passive stylus). If there is no causal relationship between any given two steps, the present application does not limit the execution order of these two steps. The stylus sensing method 700 may begin at step 710.

Step 710: selecting one of the multiple first electrodes 121. The step may be configured to sequentially or randomly select one of the multiple first electrodes 121 which emits no driving signal yet. In another embodiment, the step may be configured to select a set of the multiple first electrodes 121, which comprises a plurality of adjacent first electrodes 121. Person having ordinary skill in the art may understand that in the embodiment utilizing a set of first electrodes, the detection accuracy may be lower. But the various embodiments provided by the present application are still applicable.

Step 720: performing one-dimensional stylus sensing method according to the selected one of the first electrodes 121 to get one or multiple one-dimensional sensing information, or one or more single-dimensional arrays. Each element of the one-dimensional sensing information is corresponding to one of the multiple second electrodes 122, respectively. When the stylus 130 approaching or touching the touch panel or screen 120, one-dimensional tail signal sensing information can be generated during the tail signal period 320, and one-dimensional head signal sensing information can be generated during the head signal period 330. If it is applicable to the embodiment as shown in FIG. 4, one-dimensional head signal sensing information can be generated in each of the head signal periods, respectively.

Figure 10:
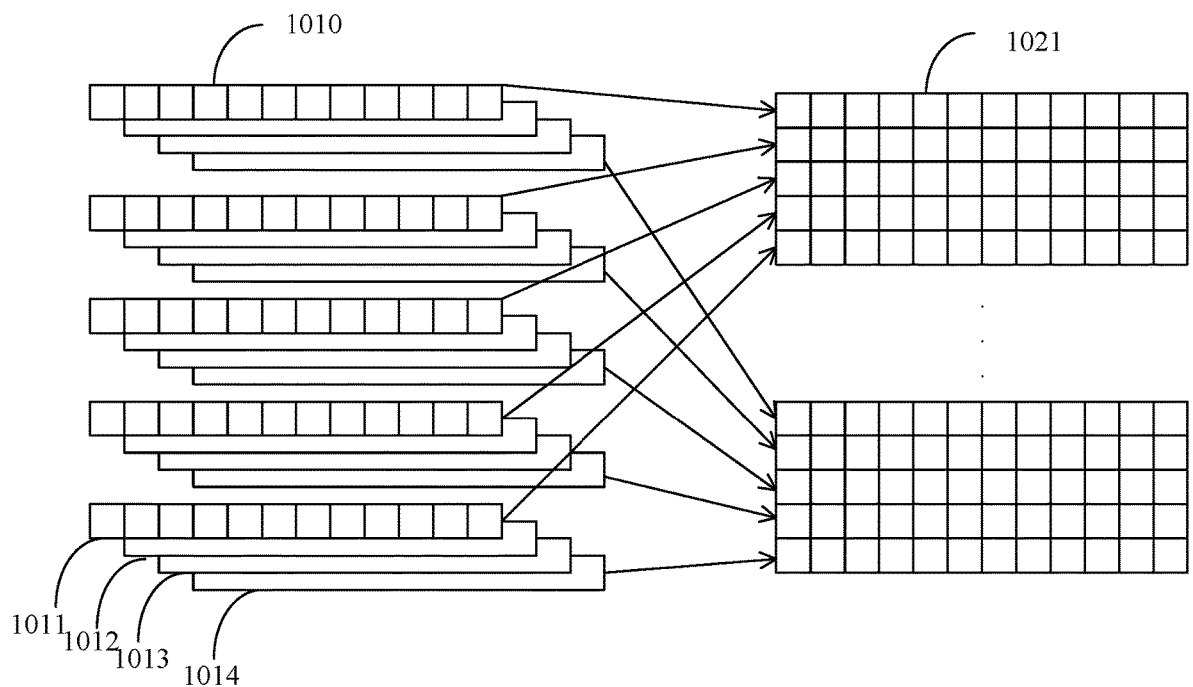
FIG. 10 depicts a diagram of sensing information in accordance with an embodiment of the present application.

Please refer to FIG. 10, which depicts a diagram of sensing information in accordance with an embodiment of the present application. Multiple sets of sensing information 1010 are shown in FIG. 10. Each set of sensing information 1010 may comprise one-dimensional tail signal sensing information 1011, one-dimensional first head signal sensing information 1012, one-dimensional second head signal sensing information 1013, and one-dimensional third head signal sensing information 1014. Each set of the sensing information 1010 is corresponding to one of the first electrodes selected at step 710. The step 710 may be configured to get one of the multiple sets of sensing information 1010 or one of the single-dimensional arrays.

Step 730: determining whether all the first electrodes being selected. When there does not exist one of the first electrodes being non-selected, the flow may proceed to step 740. Otherwise, the flow may return to step 710.

Step 740: forming one or more sensing images or two-dimensional sensing information based on the one or more one-dimensional sensing information, respectively, according to positions of the first electrodes 121 corresponding to the one or more one-dimensional sensing information. Take the embodiment as shown in FIG. 10, a tail signal sensing image 1021 may be formed based on the one-dimensional tail signal sensing information 1011 of each set of the sensing information 1010 according to positions of the first electrodes 121 corresponding to the one-dimensional tail signal sensing information 1011. In a similar fashion, a first head signal sensing image may be formed based on the one-dimensional first head signal sensing information 1012 of each set of the sensing information 1010 according to positions of the first electrodes 121 corresponding to the one-dimensional first head signal sensing information 1012. A second head signal sensing image may be formed based on the one-dimensional second head signal sensing information 1013 of each set of the sensing information 1010 according to positions of the first electrodes 121 corresponding to the one-dimensional second head signal sensing information 1013. A third head signal sensing image may be formed based on the one-dimensional third head signal sensing information 1014 of each set of the sensing information 1010 according to positions of the first electrodes 121 corresponding to the one-dimensional third head signal sensing information 1014. For convenience, the first head signal sensing image, the second head signal sensing image, and the third head signal sensing image are collectively a head signal sensing image. Each element of the head signal sensing image comprises three sensing information, i.e., the first head signal sensing information, the second head signal sensing information, and the third head signal sensing information.

Step 750: calculating stylus information according to the one or more sensing images. In one embodiment, based on signal strengths between corresponding elements in the two sensing images, it can be determined that which one of the head electrode 240 and the tail electrode 250 of the stylus 130 approaching or touching the touch panel or screen 120. When it is determined that the tail electrode 250 approaching or touching the touch panel or screen 120, an approaching or touching position of the stylus 130 may be calculated according to the tail signal sensing image. When it is determined that the head electrode 240 approaching or touching the touch panel or screen 120, an approaching or touching position of the stylus 130 may be calculated according to the head signal sensing image.

In one embodiment, when there are multiple styli 130 approaching or touching the touch panel or screen 120. One of the styli 130 is approaching or touching by its head electrode 240. And another one of the styli is approaching or touching by its tail electrode 250. Two approaching or touching positions corresponding to these two styli 130 may be calculated according to the head signal sensing image and the tail signal sensing image, respectively.

When the stylus 130 comprises multiple head electrodes 240, multiple head signal sensing images may be generated at step 740. Based on signal strengths of corresponding elements in at least one of the head signal sensing images and the tail signal sensing image, it can determine that which one of the head electrode 240 and the tail electrode 250 of the stylus 130 approaching or touching the touch panel or screen 120. Next, when it is determined that the head electrode 240 approaching or touching the touch panel or screen 120, one or any combination of following information can be calculated according to the head signal sensing images: an approaching or touching position of the stylus 130, a pressure on the stylus 130, a projected direction of the stylus 130 on the touch panel or screen 120, and a tilt angle between the stylus 130 and a surface of the touch panel or screen 120.

Figure 8:
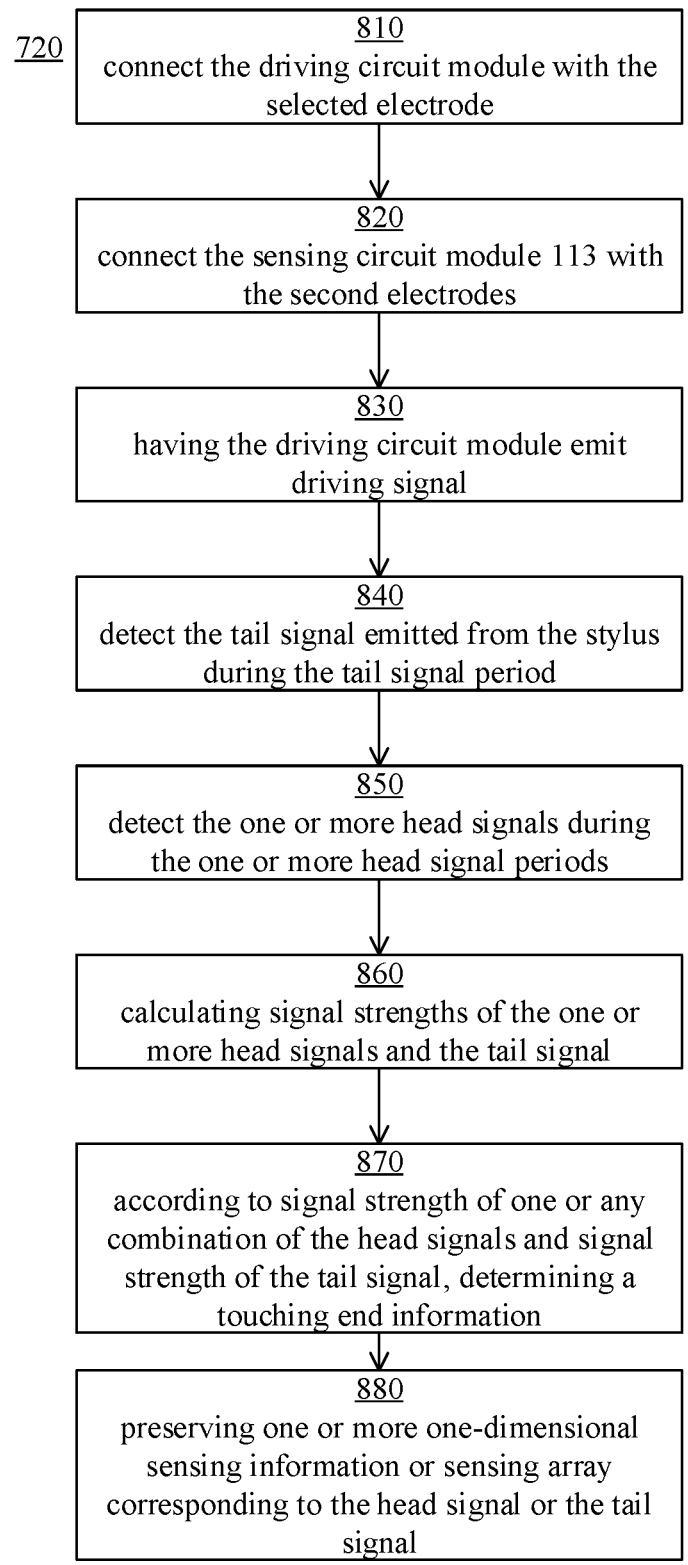
FIG. 8 depicts a flowchart diagram of a one-dimensional stylus sensing method 720 in accordance with an embodiment of the present application.

Please refer to FIG. 8, which depicts a flowchart diagram of a one-dimensional stylus sensing method 720 in accordance with an embodiment of the present application. The one-dimensional stylus sensing method 720 may be applied to the touch system 100 as shown in FIG. 1. The one-dimensional stylus sensing method 720 may be configured to sense multiple styli 130. In one embodiment, the one-dimensional stylus sensing method 720 may be embodied as the firmware stored in the non-volatile memory 116 as shown in FIG. 1. The firmware may comprise multiple instructions and data. The processor module 114 may execute the multiple instructions in the firmware to realize the one-dimensional stylus sensing method 720. In one embodiment, when the modulations of the one or more head signals and the tail signal emitted by the stylus 130 are different from the driving signal emitted by the touch sensitive processing apparatus 110, the one-dimensional stylus sensing method 720 may be performed concurrently with the sensing of external conductive objects (e.g., fingers and passive stylus). If there is no causal relationship between any given two steps, the present application does not limit the execution order of these two steps. The one-dimensional stylus sensing method 720 may begin at step 810. One of the first electrodes is selected already.

Step 810: having the interconnection network module 111 connect the driving circuit module 112 with the selected electrode 121.

Step 820: having the interconnection network module 111 connect the sensing circuit module 113 with the second electrodes 122.

Step 830: having the driving circuit module 112 emit driving signal. In this embodiment, the driving signal may be used as the beacon signal in the embodiments as shown in FIG. 3 or FIG. 4.

Step 840: having the sensing circuit module 113 detect the tail signal emitted from the stylus 130 during the tail signal period 320. As discussed above, the step can generate one-dimensional tail signal sensing information or a tail signal sensing array 1011.

Step 850: having the sensing circuit module 113 detect the one or more head signals emitted from the stylus 130 during the one or more head signal periods. As discussed above, the step can generate one or more one-dimensional head signal sensing information or head signal sensing arrays 1012~1014. In one embodiment, the present step may generate one or more one-dimensional external object sensing array or external object sensing array for recording sensing information relevant to external conductive object (e.g., finger or passive stylus).

In one embodiment, the flow may proceed to optional steps 860 through 880. When there is only one historical trace corresponding to one stylus 130, it may determine which one of the head electrode 240 and the tail electrode 250 approaching or touching the touch panel or screen 120. In case that it is determined that the tail electrode 250 approaching or touching, it does not need the one or more one-dimensional head signal sensing information 1012 through 1014. In case that it is determined that the head electrode 240 approaching or touching, it does not need the one-dimensional tail signal sensing information 1011. Alternatively, it does not need to execute steps 860 through 880. That is to leave all the one-dimensional sensing information to steps 740 and 750.

Step 860: calculating signal strengths of the one or more head signals and the tail signal, respectively.

Step 870: according to signal strength of one or any combination of the head signals and signal strength of the tail signal, determining a touching end information which reflects which one of the head electrode 240 and the tail electrode 250 of the stylus 130 approaching or touching the touch panel or screen 120.

Step 880: preserving one or more one-dimensional sensing information or sensing array corresponding to the head signal or the tail signal. When it is determined that the tail of the stylus 130 approaching or touching the touch panel or screen 120, one dimensional tail signal sensing information or tail signal sensing array 1011 can be preserved. When it is determined that the head of the stylus 130 approaching or touching the touch panel or screen 120, one dimensional head signal sensing information or head signal sensing array 1012 may be preserved. Furthermore, when there are multiple head signal periods, multiple one-dimensional head signal sensing information or head signal sensing arrays 1012 through 1014 may be preserved.

Multiple set of sensing information gathered by the embodiment as shown in FIG. 8 can be used to form one or more two-dimensional sensing information or sensing image at step 740 as shown in FIG. 7. As a result, one or mote styli 130 information can be calculated at step 750.

Figure 9:
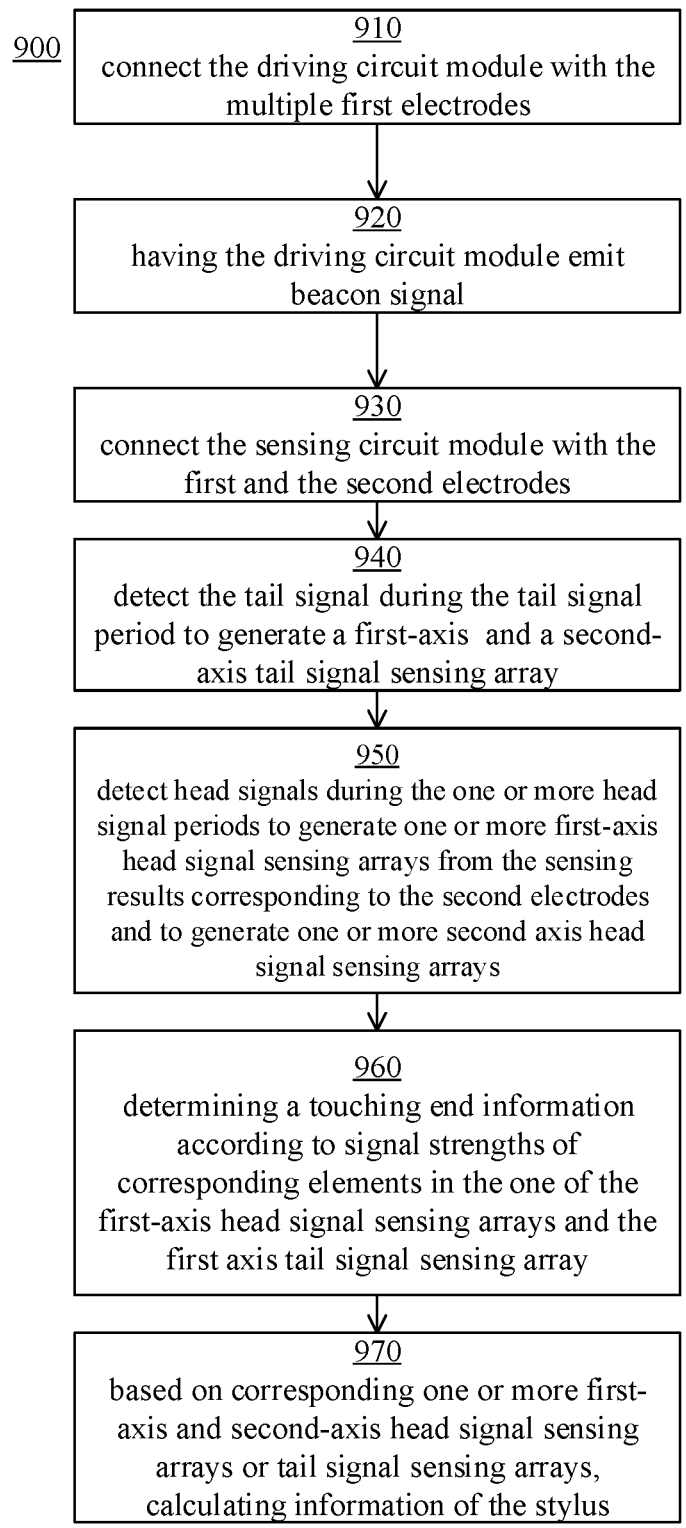
FIG. 9 depicts a flowchart diagram of a stylus sensing method 900 in accordance with an embodiment of the present application.

By the stylus sensing method 700, the driving signals emitted by the first electrodes are considered as the beacon signals. Assuming that there are N first electrodes, where N is a positive integer larger than 1, N stylus signal periods 300 is required for detecting one or more styli 130 on the entire panel. If it is desired to detect a stylus 130 in one single stylus signal period 300, please refer to FIG. 9, which depicts a flowchart diagram of a stylus sensing method 900 in accordance with an embodiment of the present application. The stylus sensing method 900 may be applied to the touch system 100 as shown in FIG. 1. The stylus sensing method 900 may be configured to sense a single stylus 130. Alternatively, the stylus sensing method 900 may be configured to simultaneously sense one stylus 130 with its head electrode 240 approaching or touching the touch panel or screen 120 and another stylus with its tail electrode 250 approaching or touching the touch panel or screen 120. In one embodiment, the stylus sensing method 900 may be embodied as the firmware stored in the non-volatile memory 116 as shown in FIG. 1. The firmware may comprise multiple instructions and data. The processor module 114 may execute the multiple instructions in the firmware to realize the stylus sensing method 900. If there is no causal relationship between any given two steps, the present application does not limit the execution order of these two steps. The stylus sensing method 900 may begin at step 910.

Step 910: having the interconnection network module 111 connect the driving circuit module 112 with the multiple first electrodes 121. In an alternative embodiment, it may have the interconnection network module 111 connect the driving circuit module 112 with the first electrodes 121 and the second electrodes 122.

Step 920: having the driving circuit module 112 emit beacon signal. Hence, the beacon signal would be propagated to a stylus 130 approaching or touching at least one of the first electrodes 121.

Step 930: having the interconnection network module 111 connect the sensing circuit module 113 with the multiple first electrodes 121 and the multiple second electrodes 122.

Step 940: having the sensing circuit module 113 detect the tail signal during the tail signal period 310 to generate a first-axis tail signal sensing array from the sensing results corresponding to the second electrodes 122 and to generate a second-axis tail signal sensing array from the sensing results corresponding to the first electrodes 121.

Figure 11:
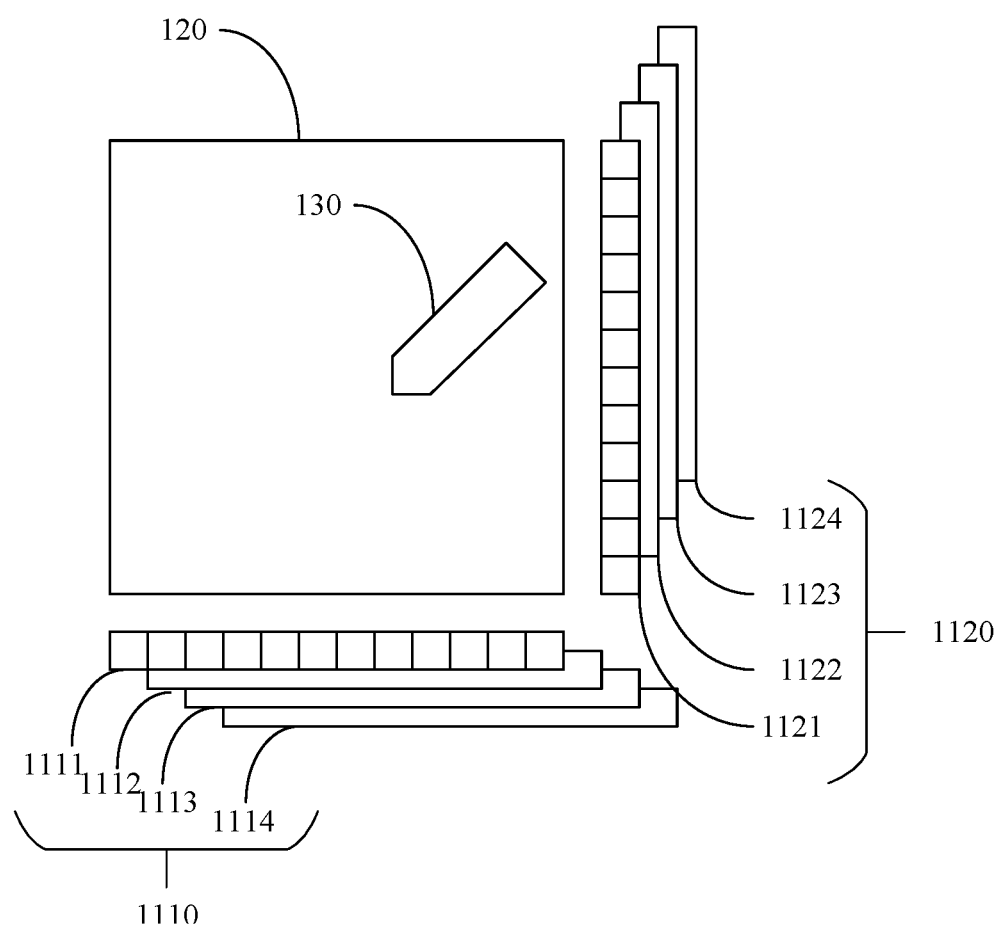
FIG. 11 illustrates a diagram of two axis sensing arrays in accordance with one embodiment of the present application.

Please refer to FIG. 11, which illustrates a diagram of two axis sensing arrays in accordance with one embodiment of the present application. At step 940, the first-axis tail signal sensing array 1111 and the second-axis tail signal sensing array 1121 are generated.

Step 950: having the sensing circuit module 113 detect head signals during the one or more head signal periods to generate one or more first-axis head signal sensing arrays 1112 from the sensing results corresponding to the second electrodes 122 and to generate one or more second axis head signal sensing arrays 1122 from the sensing results corresponding to the first electrodes 121.

As shown in FIG. 11, the first-axis first head signal sensing array 1112 and the second-axis first head signal sensing array 1122 can be generated at step 950. Besides, a first-axis second head signal sensing array 1113 and the second-axis second head signal sensing array 1123 may be also generated at step 950. In addition, a first-axis third head signal sensing array 1114 and the second-axis third head signal sensing array 1124 may be also generated at step 950.

In one embodiment, the first-axis first head signal sensing array 1112, the first-axis second head signal sensing array 1113, and the first-axis third head signal sensing array 1114 are collectively referred to as the first-axis head sensing information. Each element of the first-axis head sensing information comprises three head signal sensing information, i.e., the first head signal sensing information, the second head signal sensing information, and the third head signal sensing information. Similarly, the second-axis first head signal sensing array 1122, the second-axis second head signal sensing array 1123, and the second-axis third head signal sensing array 1124 are collectively referred to as the second-axis head sensing information. Each element of the second-axis head sensing information comprises three head signal sensing information, i.e., the first head signal sensing information, the second head signal sensing information, and the third head signal sensing information. The first-axis head signal sensing information and optional first-axis tail signal sensing information are collectively referred to as first-axis sensing information 1110. The second-axis head signal sensing information and optional second-axis tail signal sensing information are collectively referred to as second-axis sensing information 1120.

Step 960: determining a touching end information related to which one of the head electrode 240 and the tail electrode 250 of the stylus 130 approaching or touching the touch panel or screen 120 according to signal strengths of corresponding elements in the one of the first-axis head signal sensing arrays and the first axis tail signal sensing array. Similarly, at the step 960, it may determine the touching end information of the stylus 130 according to signal strengths of corresponding elements in the one of the second-axis head signal sensing arrays and the second axis tail signal sensing array.

In one embodiment, when a head signal strength and a tail signal strength of a pair of elements are both lower than a threshold, the determination may be avoided. In an alternative embodiment, it may determine the touching end information according to a maximum and a maximum of differences among all pairs of elements. For example, when the first stylus 130 approaching or touching the touch panel or screen 120 by its head electrode 240, the difference of the pair of elements which is closest to the approaching or touching position of the first stylus 130 would be the maximum. When the second stylus 130 approaching or touching the touch panel or screen 120 by its tail electrode 250, the difference of the pair of elements which is closest to the appropriate of touching position of the second stylus 130 would be the minimum and negative.

In case the maximum of the differences exceeds a threshold and the minimum is not less than another threshold, it implies that there is a stylus 130 approaching or touching the touch panel or screen 120 by its head electrode 240. In case that the minimum is less than the other threshold and the maximum does not exceed the threshold, it implies that there is another stylus approaching or touching the touch panel or screen 120 by its tail electrode. When the maximum exceeds the threshold and the minimum is less than the other threshold, it may be determined that a first stylus 130 approaching or touching the touch panel or screen by its head electrode 240 and a second stylus 130 approaching or touching the touch panel or screen by its tail electrode 250.

Step 970: based on corresponding one or more first-axis and second-axis head signal sensing arrays or tail signal sensing arrays, calculating information of the stylus 130. Based on a single head signal sensing array (for example, 1112), an approaching or touching position of the head electrode 240 related to the first axis can be calculated. Or based on multiple first-axis head signal sensing arrays (for example, 1112 and 1114), two approaching or touching positions of the tip electrode 241 and the ring electrode 242 related to the first axis can be calculated, respectively. Similarly, based on a single second-axis head signal sensing array (for example, 1122), an approaching or touching position of the head electrode 240 related to the second axis can be calculated. Or based on multiple second-axis head signal sensing arrays (for example, 1122 and 1124), two approaching or touching positions of the tip electrode 241 and the ring electrode 242 related to the second axis can be calculated, respectively.

Based on the approaching or touching positions related to the first axis and the second axis of the head electrode 240, the approaching or touching position of the stylus 130 can be obtained. Based on the approaching or touching positions related to the first axis and the second axis of the tip electrode 241, the approaching or touching position of the tip electrode 241 of the stylus 130 can be obtained. Based on the approaching or touching positions related to the first axis and the second axis of the ring electrode 242, the approaching or touching position of the ring electrode 242 of the stylus 130 can be obtained. When the arrangement of the tip electrode 241 and the ring electrode 242 is predetermined, a tilt angle can be calculated according to the approaching or touching positions of the tip electrode 241 and the ring electrode 242.

In a similar fashion, based on the first-axis tail signal sensing array 1111, an approaching or touching position of the tail electrode 250 related to the first axis can be calculated. Based on the first-axis tail signal sensing array 1121, an approaching or touching position of the tail electrode 250 related to the second axis can be calculated. Based on the approaching or touching positions related to the first axis and the second axis of the tail electrode 250, the approaching or touching position of the tail position 250 of the stylus 130 can be obtained.

When it is determined that there is only one stylus 130 at step 960, it may perform calculations corresponding to one of the head electrode 240 and the tail electrode 250 of the stylus 130. It does not need to perform calculations corresponding to two of the head electrode 240 and the tail electrode 250. This may save computing resources and computing power. And it may further increase reporting rate of the position of the stylus.

According to an embodiment of the present application, a processing circuit applicable to an active stylus is provided. The processing circuit comprising: a driving circuit for emitting electrical signals; a sensing circuit for detecting beacon signals; an interconnection network for connecting a head electrode and a tail electrode located in both ends of the active stylus, respectively; and a control circuit configured for: having the interconnection network concurrently connect the sensing circuit with the head electrode and the tail electrode, and having the sensing circuit detect the beacon signals during a beacon signal period; and after the beacon signals are detected by the sensing circuit, performing following: having the interconnection network connect the driving circuit with the tail electrode, and having the driving circuit emit a tail signal during a tail signal period which is after the beacon signal period; and having the interconnection network connect the driving circuit with the head electrode, and having the driving circuit emit a head signal during a head signal period which is after the beacon signal period.

Preferably, in order to save cost and power, to improve fall-resistance and shock-resistance, and to avoid synchronization issue of having two receiving channels, such that the tail signal period and the head signal period can be closely adjacent to each other and no guard period is in need, wherein the sensing circuit comprises components for one single channel for concurrently detect the beacon signals from the head electrode and the tail electrode, wherein the tail signal period and the head signal period are adjacent to each other and no guard period is in between.

Preferably, in order to provide pressure information to touch sensitive processing apparatus, the active stylus further comprises a component with fixed resistance and a force sensing component, wherein resistance of the force sensing component would be varied according to pressure applied to the head electrode, first head signal in a first modulation provided by the driving circuit propagates through the component with fixed resistance to the head electrode, second head signal in a second modulation provided by the driving circuit propagates through the force sensing component to the head electrode.

Preferably, in order to save cost and power, to improve fall-resistance and shock-resistance, wherein the driving circuit comprises components for one single channel, the first head signal is provided by the driving circuit during a first head signal period of the head signal period, the second head signal is provided by the driving circuit during a second head signal period of the head signal period.

Preferably, in order to provide additional information to touch sensitive processing apparatus, wherein the head electrode comprises a tip electrode and one or more ring electrodes, wherein one of the ends of the active stylus are surround by the one or more ring electrodes, the first head signal is provided by the driving circuit during a first head signal period of the head signal period to the tip electrode, a third head signal is provided by the driving circuit during a third head signal period of the head signal period to the one or more ring electrodes.

Preferably, in order to save cost and power, to improve fall-resistance and shock-resistance, wherein the driving circuit comprises components for one single channel, the first head signal is provided by the driving circuit during a first head signal period of the head signal period, the third head signal is provided by the driving circuit during a third head signal period of the head signal period.

Preferably, in order to adjust configuration conveniently, wherein the processing circuit further comprises a processor for executing instructions stored in a non-volatile memory to implement the control circuit.

According to an embodiment of the present application, an active stylus is provided. The active stylus comprises the head electrode, the tail electrode, and the processing circuit.

According to an embodiment of the present application, a processing method for an active stylus is provided. The active stylus comprises a head electrode and a tail electrode located in both ends of the active stylus, respectively, the processing method comprising: having an interconnection network of the active stylus concurrently connect a sensing circuit of the active stylus with the head electrode and the tail electrode, and having the sensing circuit detect beacon signals during a beacon signal period; and after the beacon signals are detected by the sensing circuit, performing following steps: having the interconnection network connect a driving circuit of the active stylus with the tail electrode, and having the driving circuit emit a tail signal during a tail signal period which is after the beacon signal period; and having the interconnection network connect the driving circuit with the head electrode, and having the driving circuit emit a head signal during a head signal period which is after the beacon signal period.

Preferably, in order to save cost and power, to improve fall-resistance and shock-resistance, and to avoid synchronization issue of having two receiving channels, such that the tail signal period and the head signal period can be closely adjacent to each other and no guard period is in need, wherein the sensing circuit comprises components for one single channel for concurrently detect the beacon signals from the head electrode and the tail electrode, wherein the tail signal period and the head signal period are adjacent to each other and no guard period is in between.

Preferably, in order to provide pressure information to touch sensitive processing apparatus, the active stylus further comprises a component with fixed resistance and a force sensing component, wherein resistance of the force sensing component would be varied according to pressure applied to the head electrode, the processing method of the active stylus further comprises: having the driving circuit provide a first head signal in a first modulation to the head electrode through the component with fixed resistance; and having the driving circuit provide a second head signal in a second modulation to the head electrode through the force sensing component.

Preferably, in order to save cost and power, to improve fall-resistance and shock-resistance, wherein the driving circuit comprises components for one single channel, the first head signal is provided by the driving circuit during a first head signal period of the head signal period, the second head signal is provided by the driving circuit during a second head signal period of the head signal period.

Preferably, in order to provide additional information to touch sensitive processing apparatus, wherein the head electrode comprises a tip electrode and one or more ring electrodes, wherein one of the ends of the active stylus are surround by the one or more ring electrodes, the processing method of the active stylus further comprises: having the driving circuit provide a first head signal in a first modulation to the tip electrode; and having the driving circuit provide a third head signal in a third modulation to one or more ring electrodes.

Preferably, in order to save cost and power, to improve fall-resistance and shock-resistance, wherein the driving circuit comprises components for one single channel, the first head signal is provided by the driving circuit during a first head signal period of the head signal period, the third head signal is provided by the driving circuit during a third head signal period of the head signal period.

According to an embodiment of the present application, a touch sensitive processing apparatus applicable to a touch panel is provided. The touch panel comprises multiple first electrodes in parallel to a first axis and multiple second electrodes in parallel to a second axis. The touch sensitive processing apparatus comprising: an interconnection network module for connecting the first electrodes and the second electrodes, respectively; a driving circuit module for providing driving signal; a sensing circuit module for sensing electrical signals; and a processor module for executing instructions stored in a non-volatile memory to realize: selecting one of the first electrodes in turns and performing following: having the interconnection network module connect the driving circuit module to the selected first electrodes; having the interconnection network module connect the sensing circuit module to the second electrodes; having the driving circuit module emit the driving signal; having the sensing circuit module sense tail signals during a tail signal period for gathering one-dimensional tail signal sensing information; and having the sensing circuit module sense head signals during a tail signal period for gathering one-dimensional head signal sensing information; forming a tail signal sensing image by all of the one-dimensional tail signal sensing information; forming a head signal sensing image by all of the one-dimensional head signal sensing information; and calculating an approaching or touching position of the active stylus and a touching end information related to which one of a head end and a tail end of the active stylus approaching or touching the touch panel according to the tail signal sensing image and the head signal sensing image.

Preferably, in order to save cost and power, to improve fall-resistance and shock-resistance, and to avoid synchronization issue of having two receiving channels, wherein the tail signal period and the head signal period are adjacent to each other, and no guard period is in between.

Preferably, in order to provide pressure information to touch sensitive processing apparatus, wherein the one-dimensional head signal sensing information comprises sensing information of a first head signal and a second head signal, signal strength of the second head signal is corresponding to a pressure on a force sensing component installed in a head end of the active stylus, the processor module is further configured for calculating a value of the pressure according to signal strengths of the first head signal and the second head signal.

Preferably, in order to save cost and power, to improve fall-resistance and shock-resistance, the driving circuit of the active stylus comprises components for one single channel, wherein the sensing circuit module sense the first head signal during a first head signal period of the head signal period, and the sensing circuit module sense the second head signal during a second head signal period of the head signal period.

Preferably, in order to provide additional information to touch sensitive processing apparatus, wherein the head electrode comprises a tip electrode and one or more ring electrodes, wherein the head end of the active stylus are surround by the one or more ring electrodes, wherein the one-dimensional head signal sensing information comprises sensing information of a first head signal and a third head signal, wherein the first head signal is emitted by the tip electrode, the third head signal is emitted by the one or more ring electrodes, the processor module is further configured for: calculating two approaching or touching positions of the ring electrodes and the one or more ring electrodes according to the head signal sensing image; calculating a projected direction of the active stylus according to the two approaching or touching positions; and calculating a tilt angle between the active stylus and the touch panel according to the two approaching or touching positions and an arrangement between the tip electrode and the one or more ring electrodes.

Preferably, in order to save cost and power, to improve fall-resistance and shock-resistance, wherein the driving circuit comprises components for one single channel, the sensing circuit module is configured to sense the first head signal during a first head signal period of the head signal period, the sensing circuit module is configured to sense the third head signal during a third head signal period of the head signal period.

According to an embodiment of the present application, a touch sensitive processing method for a touch sensitive processing apparatus which is applicable to a touch panel is provided. The touch panel comprises multiple first electrodes in parallel to a first axis and multiple second electrodes in parallel to a second axis. The touch sensitive processing method comprising: selecting one of the first electrodes in turns and performing following steps: having an interconnection network module of the touch sensitive processing apparatus connect a driving circuit module of the touch sensitive processing apparatus to the selected first electrode; having the interconnection network module connect a sensing circuit module of the touch sensitive processing apparatus to the second electrodes; having the driving circuit module emit the driving signal; having the sensing circuit module sense tail signals during a tail signal period for gathering one-dimensional tail signal sensing information; and having the sensing circuit module sense head signals during a tail signal period for gathering one-dimensional head signal sensing information; forming a tail signal sensing image by all of the one-dimensional tail signal sensing information; forming a head signal sensing image by all of the one-dimensional head signal sensing information; and calculating an approaching or touching position of the active stylus and a touching end information related to which one of a head end and a tail end of the active stylus approaching or touching the touch panel according to the tail signal sensing image and the head signal sensing image.

Preferably, in order to save cost and power, to improve fall-resistance and shock-resistance, and to avoid synchronization issue of having two receiving channels, wherein the tail signal period and the head signal period are adjacent to each other, and no guard period is in between.

Preferably, in order to provide pressure information to touch sensitive processing apparatus, wherein the one-dimensional head signal sensing information comprises sensing information of a first head signal and a second head signal, signal strength of the second head signal is corresponding to a pressure on a force sensing component installed in a head end of the active stylus, the touch sensitive processing method further comprises calculating a value of the pressure according to signal strengths of the first head signal and the second head signal.

Preferably, in order to save cost and power, to improve fall-resistance and shock-resistance, the driving circuit of the active stylus comprises components for one single channel, wherein the sensing circuit module sense the first head signal during a first head signal period of the head signal period, and the sensing circuit module sense the second head signal during a second head signal period of the head signal period.

Preferably, in order to provide additional information to touch sensitive processing apparatus, wherein the head electrode comprises a tip electrode and one or more ring electrodes, wherein one of the ends of the active stylus are surround by the one or more ring electrodes, wherein the one-dimensional head signal sensing information comprises sensing information of a first head signal and a third head signal, wherein the first head signal is emitted by the tip electrode, the third head signal is emitted by the one or more ring electrodes, the touch sensitive processing method further comprises: calculating two approaching or touching positions of the ring electrodes and the one or more ring electrodes according to the head signal sensing image; calculating a projected direction of the active stylus according to the two approaching or touching positions; and calculating a tilt angle between the active stylus and the touch panel according to the two approaching or touching positions and an arrangement between the tip electrode and the one or more ring electrodes.

Preferably, in order to save cost and power, to improve fall-resistance and shock-resistance, wherein the driving circuit comprises components for one single channel, the sensing circuit module is configured to sense the first head signal during a first head signal period of the head signal period, the sensing circuit module is configured to sense the third head signal during a third head signal period of the head signal period.

According to an embodiment of the present application, a touch sensitive processing apparatus which is applicable to a touch panel is provided. The touch panel comprises multiple first electrodes in parallel to a first axis and multiple second electrodes in parallel to a second axis. The touch sensitive processing apparatus comprising: an interconnection network module for connecting the first electrodes and the second electrodes, respectively; a driving circuit module for providing driving signal; a sensing circuit module for sensing electrical signals; and a processor module for executing instructions stored in a non-volatile memory to realize: having the interconnection network module connect the driving circuit module to the first electrodes; having the driving circuit module emit beacon signal; having the interconnection network connect the sensing circuit module with the first and the second electrodes; during a tail signal period, having the sensing circuit detect tail signal via the second electrodes and the first electrodes to gather a first-axis tail signal sensing information and a second-axis tail signal sensing information; during a head signal period, having the sensing circuit detect tail signal via the second electrodes and the first electrodes to gather a first-axis head signal sensing information and a second-axis head signal sensing information; and calculating an approaching or touching position of the active stylus and a touching end information related to which one of a head end and a tail end of the active stylus approaching or touching the touch panel according to the first-axis tail signal sensing information, the second-axis tail signal sensing information, the first-axis head signal sensing information, and the second-axis head signal sensing information.

Preferably, in order to save cost and power, to improve fall-resistance and shock-resistance, and to avoid synchronization issue of having two receiving channels, wherein the tail signal period and the head signal period are adjacent to each other, and no guard period is in between.

Preferably, in order to provide pressure information to touch sensitive processing apparatus, wherein the one-dimensional head signal sensing information comprises sensing information of a first head signal and a second head signal, signal strength of the second head signal is corresponding to a pressure on a force sensing component installed in a head end of the active stylus, wherein the processor module is further configured for calculating a value of the pressure according to signal strengths of the first head signal and the second head signal.

Preferably, in order to save cost and power, to improve fall-resistance and shock-resistance, the driving circuit of the active stylus comprises components for one single channel, wherein the sensing circuit module sense the first head signal during a first head signal period of the head signal period, and the sensing circuit module sense the second head signal during a second head signal period of the head signal period.

Preferably, in order to provide additional information to touch sensitive processing apparatus, wherein the head electrode comprises a tip electrode and one or more ring electrodes, wherein one of the ends of the active stylus are surround by the one or more ring electrodes, wherein the one-dimensional head signal sensing information comprises sensing information of a first head signal and a third head signal, wherein the first head signal is emitted by the tip electrode, the third head signal is emitted by the one or more ring electrodes, wherein the processor module is further configured for: calculating two approaching or touching positions of the ring electrodes and the one or more ring electrodes according to the head signal sensing image; calculating a projected direction of the active stylus according to the two approaching or touching positions; and calculating a tilt angle between the active stylus and the touch panel according to the two approaching or touching positions and an arrangement between the tip electrode and the one or more ring electrodes.

Preferably, in order to save cost and power, to improve fall-resistance and shock-resistance, wherein the driving circuit comprises components for one single channel, the sensing circuit module is configured to detect the first head signal during a first head signal period of the head signal period, the sensing circuit module is configured to detect the third head signal during a third head signal period of the head signal period.

According to an embodiment of the present application, a touch sensitive processing method for a touch sensitive apparatus which is applicable to a touch panel is provided. The touch panel comprises multiple first electrodes in parallel to a first axis and multiple second electrodes in parallel to a second axis. The touch sensitive processing method comprising: having an interconnection network module of the touch sensitive processing apparatus connect the driving circuit module to the first electrodes; having a driving circuit module of the touch sensitive processing apparatus emit beacon signal; having the interconnection network connect the sensing circuit module with the first and the second electrodes; during a tail signal period, having the sensing circuit sense tail signal via the second electrodes and the first electrodes to gather a first-axis tail signal sensing information and a second-axis tail signal sensing information; during a head signal period, having the sensing circuit sense tail signal via the second electrodes and the first electrodes to gather a first-axis head signal sensing information and a second-axis head signal sensing information; and calculating an approaching or touching position of the active stylus and a touching end information related to which one of a head end and a tail end of the active stylus approaching or touching the touch panel according to the first-axis tail signal sensing information, the second-axis tail signal sensing information, the first-axis head signal sensing information, and the second-axis head signal sensing information.

Preferably, in order to save cost and power, to improve fall-resistance and shock-resistance, and to avoid synchronization issue of having two receiving channels, wherein the tail signal period and the head signal period are adjacent to each other, and no guard period is in between.

Preferably, in order to provide pressure information to touch sensitive processing apparatus, wherein the one-dimensional head signal sensing information comprises sensing information of a first head signal and a second head signal, signal strength of the second head signal is corresponding to a pressure on a force sensing component installed in a head end of the active stylus, wherein the touch sensitive processing method further comprises: calculating a value of the pressure according to signal strengths of the first head signal and the second head signal.

Preferably, in order to save cost and power, to improve fall-resistance and shock-resistance, the driving circuit of the active stylus comprises components for one single channel, wherein the sensing circuit module sense the first head signal during a first head signal period of the head signal period, and the sensing circuit module sense the second head signal during a second head signal period of the head signal period.

Preferably, in order to provide additional information to touch sensitive processing apparatus, wherein the head electrode comprises a tip electrode and one or more ring electrodes, wherein one of the ends of the active stylus are surround by the one or more ring electrodes, wherein the one-dimensional head signal sensing information comprises sensing information of a first head signal and a third head signal, wherein the first head signal is emitted by the tip electrode, the third head signal is emitted by the one or more ring electrodes, wherein the touch sensitive processing method further comprises: calculating two approaching or touching positions of the ring electrodes and the one or more ring electrodes according to the head signal sensing image; calculating a projected direction of the active stylus according to the two approaching or touching positions; and calculating a tilt angle between the active stylus and the touch panel according to the two approaching or touching positions and an arrangement between the tip electrode and the one or more ring electrodes.

Preferably, in order to save cost and power, to improve fall-resistance and shock-resistance, wherein the driving circuit comprises components for one single channel, the sensing circuit module is configured to sense the first head signal during a first head signal period of the head signal period, the sensing circuit module is configured to sense the third head signal during a third head signal period of the head signal period.

According to an embodiment of the present application, a touch system is provided. The touch system comprising the touch panel and the touch sensitive processing apparatus. Preferably, the touch system further comprises abovementioned active stylus.

The active stylus provided by the present application does not bother to determine which one of the head electrode and the tail electrode received the beacon signal emitted from the touch panel. It can equip the sensing circuit with a single channel to detect the beacon signal to save cost and power in order to improve fall-resistance and shock-resistance. Besides, the active stylus can utilize the driving circuit with a single channel to emit electrical signals corresponding to the beacon signal in a time-sharing manner. The touch sensitive processing apparatus of the touch panel can determine an approaching or touching position and a touching end information according to the received signals during the head signal period and the tail signal period after the beacon signal. Based on different touching end information, the touch system may respond differently. For example, the active stylus touching with its tail end can be used to erase. When the electrical signals transmitted during multiple head signal periods by the active stylus, it can carry information with regard to pressure, projected direction, tilt angle and etc. to the touch sensitive processing apparatus.

Person having ordinary skill in the art can understand that the head signal or the tail signal may be modulated differently for representing status of one or more buttons of the active stylus in other embodiments of the present application. For example, when the button is pressed, the tail signal may be generated according to a first modulation. When the button is not pressed, the tail signal may be generated according to a second modulation. The sensing circuit module of the touch sensitive processing apparatus may determine the status of the button according to the modulation of the tail signal received in the tail signal period.

While the invention has been described in terms of what is presently considered to be the most practical and preferred embodiments, it is to be understood that the invention needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. A processing circuit applicable to an active stylus, comprising:
    a driving circuit for emitting electrical signals;
    a sensing circuit for detecting beacon signals;
    an interconnection network for connecting a head electrode and a tail electrode located in both ends of the active stylus, respectively; and
    a control circuit configured for:
    having the interconnection network concurrently connect the sensing circuit with the head electrode and the tail electrode, and having the sensing circuit detect the beacon signals during a beacon signal period; and
    after the beacon signals are detected by the sensing circuit, performing following:
        having the interconnection network connect the driving circuit with the tail electrode, and having the driving circuit emit a tail signal during a tail signal period which is after the beacon signal period; and
        having the interconnection network connect the driving circuit with the head electrode, and having the driving circuit emit a head signal during a head signal period which is after the beacon signal period.

2. The processing circuit of the active stylus as claimed in claim 1, wherein the sensing circuit comprises components for one single channel for concurrently detect the beacon signals from the head electrode and the tail electrode, wherein the tail signal period and the head signal period are adjacent to each other and no guard period is in between.

3. The processing circuit of the active stylus as claimed in claim 1, wherein the active stylus further comprises a component with fixed resistance and a force sensing component, wherein resistance of the force sensing component would be varied according to pressure applied to the head electrode, first head signal in a first modulation provided by the driving circuit propagates through the component with fixed resistance to the head electrode, second head signal in a second modulation provided by the driving circuit propagates through the force sensing component to the head electrode.

4. The processing circuit of the active stylus as claimed in claim 3, wherein the driving circuit comprises components for one single channel, the first head signal is provided by the driving circuit during a first head signal period of the head signal period, the second head signal is provided by the driving circuit during a second head signal period of the head signal period.

5. The processing circuit of the active stylus as claimed in claim 1, wherein the head electrode comprises a tip electrode and one or more ring electrodes, wherein one of the ends of the active stylus are surround by the one or more ring electrodes, a first head signal is provided by the driving circuit during a first head signal period of the head signal period to the tip electrode, a third head signal is provided by the driving circuit during a third head signal period of the head signal period to the one or more ring electrodes.

6. The processing circuit of the active stylus as claimed in claim 5, wherein the driving circuit comprises components for one single channel, the first head signal is provided by the driving circuit during the first head signal period of the head signal period, the third head signal is provided by the driving circuit during the third head signal period of the head signal period.

7. The processing circuit of the active stylus as claimed in claim 1, further comprises a processor for executing instructions stored in a non-volatile memory to implement the control circuit.

8. An active stylus, comprising the head electrode, the tail electrode, and the processing circuit as claimed in claim 1.

9. A processing method for an active stylus, wherein the active stylus comprises a head electrode and a tail electrode located in both ends of the active stylus, respectively, wherein the processing method comprising:
having an interconnection network of the active stylus concurrently connect a sensing circuit of the active stylus with the head electrode and the tail electrode, and having the sensing circuit detect beacon signals during a beacon signal period; and
after the beacon signals are detected by the sensing circuit, performing following steps:
having the interconnection network connect a driving circuit of the active stylus with the tail electrode, and having the driving circuit emit a tail signal during a tail signal period which is after the beacon signal period; and
having the interconnection network connect the driving circuit with the head electrode, and having the driving circuit emit a head signal during a head signal period which is after the beacon signal period.

10. The processing method as claimed in claim 9, wherein the sensing circuit comprises components for one single channel for concurrently detect the beacon signals from the head electrode and the tail electrode, wherein the tail signal period and the head signal period are adjacent to each other and no guard period is in between.

11. The processing method as claimed in claim 9, wherein the active stylus further comprises a component with fixed resistance and a force sensing component, wherein resistance of the force sensing component would be varied according to pressure applied to the head electrode, the processing method of the active stylus further comprises:
having the driving circuit provide a first head signal in a first modulation to the head electrode through the component with fixed resistance; and
having the driving circuit provide a second head signal in a second modulation to the head electrode through the force sensing component.

12. The processing method as claimed in claim 11, wherein the driving circuit comprises components for one single channel, the first head signal is provided by the driving circuit during a first head signal period of the head signal period, the second head signal is provided by the driving circuit during a second head signal period of the head signal period.

13. The processing method as claimed in claim 9, wherein the head electrode comprises a tip electrode and one or more ring electrodes, wherein one of the ends of the active stylus are surround by the one or more ring electrodes, the processing method further comprises:
having the driving circuit provide a first head signal in a first modulation to the tip electrode; and
having the driving circuit provide a third head signal in a third modulation to one or more ring electrodes.

14. The processing method as claimed in claim 13, wherein the driving circuit comprises components for one single channel, the first head signal is provided by the driving circuit during a first head signal period of the head signal period, the third head signal is provided by the driving circuit during a third head signal period of the head signal period.

15. A touch sensitive processing apparatus applicable to a touch panel, wherein the touch panel comprises multiple first electrodes in parallel to a first axis and multiple second electrodes in parallel to a second axis, wherein the touch sensitive processing apparatus comprising:
an interconnection network module for connecting the first electrodes and the second electrodes, respectively;
a driving circuit module for providing driving signal;
a sensing circuit module for sensing electrical signals; and
a processor module for executing instructions stored in a non-volatile memory to realize:
selecting one of the first electrodes in turns and performing following:
having the interconnection network module connect the driving circuit module to the selected first electrode;
having the interconnection network module connect the sensing circuit module to the second electrodes;
having the driving circuit module emit the driving signal;
having the sensing circuit module sense tail signals during a tail signal period for gathering one-dimensional tail signal sensing information; and having the sensing circuit module sense head signals during a head signal period for gathering one-dimensional head signal sensing information;

forming a tail signal sensing image by all of the one-dimensional tail signal sensing information;

forming a head signal sensing image by all of the one-dimensional head signal sensing information; and calculating an approaching or touching position of an active stylus and a touching end information related to which one of a head end and a tail end of the active stylus approaching or touching the touch panel according to the tail signal sensing image and the head signal sensing image.

16. The touch sensitive processing apparatus as claimed in claim 15, wherein the tail signal period and the head signal period are adjacent to each other, and no guard period is in between.

17. The touch sensitive processing apparatus as claimed in claim 15, wherein the one-dimensional head signal sensing information comprises sensing information of a first head signal and a second head signal, signal strength of the second head signal is corresponding to a pressure on a force sensing component installed in the head end of the active stylus, the processor module is further configured for calculating a value of the pressure according to signal strengths of the first head signal and the second head signal.

18. The touch sensitive processing apparatus as claimed in claim 17, wherein the sensing circuit module sense the first head signal during a first head signal period of the head signal period, and the sensing circuit module sense the second head signal during a second head signal period of the head signal period.

19. The touch sensitive processing apparatus as claimed in claim 15, wherein a head electrode of the active stylus comprises a tip electrode and one or more ring electrodes, wherein the head end of the active stylus are surround by the one or more ring electrodes, wherein the one-dimensional head signal sensing information comprises sensing information of a first head signal and a third head signal, wherein the first head signal is emitted by the tip electrode, the third head signal is emitted by the one or more ring electrodes, the processor module is further configured for:

calculating two approaching or touching positions of the ring electrodes and the one or more ring electrodes according to the head signal sensing image;

calculating a projected direction of the active stylus according to the two approaching or touching positions; and calculating a tilt angle between the active stylus and the touch panel according to the two approaching or touching positions and an arrangement between the tip electrode and the one or more ring electrodes.

20. The touch sensitive processing apparatus as claimed in claim 19, wherein the sensing circuit module is configured to sense the first head signal during a first head signal period of the head signal period, the sensing circuit module is configured to sense the third head signal during a third head signal period of the head signal period.

21. A touch system, comprising: the touch panel and the touch sensitive processing apparatus as claimed in claim 15.

22. A touch sensitive processing method for a touch sensitive processing apparatus which is applicable to a touch panel, wherein the touch panel comprises multiple first electrodes in parallel to a first axis and multiple second electrodes in parallel to a second axis, wherein the touch sensitive processing method comprising:

selecting one of the first electrodes in turns and performing following steps:

having an interconnection network module of the touch sensitive processing apparatus connect a driving circuit module of the touch sensitive processing apparatus to the selected first electrode;

having the interconnection network module connect a sensing circuit module of the touch sensitive processing apparatus to the second electrodes;

having the driving circuit module emit the driving signal;

having the sensing circuit module sense tail signals during a tail signal period for gathering one-dimensional tail signal sensing information; and having the sensing circuit module sense head signals during a head signal period for gathering one-dimensional head signal sensing information;

forming a tail signal sensing image by all of the one-dimensional tail signal sensing information;

forming a head signal sensing image by all of the one-dimensional head signal sensing information; and calculating an approaching or touching position of an active stylus and a touching end information related to which one of a head end and a tail end of the active stylus approaching or touching the touch panel according to the tail signal sensing image and the head signal sensing image.

23. The touch sensitive processing method as claimed in claim 22, wherein the tail signal period and the head signal period are adjacent to each other, and no guard period is in between.

24. The touch sensitive processing method as claimed in claim 22, wherein the one-dimensional head signal sensing information comprises sensing information of a first head signal and a second head signal, signal strength of the second head signal is corresponding to a pressure on a force sensing component installed in the head end of the active stylus, the touch sensitive processing method further comprises calculating a value of the pressure according to signal strengths of the first head signal and the second head signal.

25. The touch sensitive processing method as claimed in claim 24, wherein the sensing circuit module sense the first head signal during a first head signal period of the head signal period, and the sensing circuit module sense the second head signal during a second head signal period of the head signal period.

26. The touch sensitive processing method as claimed in claim 22, wherein a head electrode comprises a tip electrode and one or more ring electrodes, wherein one of the ends of the active stylus are surround by the one or more ring electrodes, wherein the one-dimensional head signal sensing information comprises sensing information of a first head signal and a third head signal, wherein the first head signal is emitted by the tip electrode, the third head signal is emitted by the one or more ring electrodes, wherein the touch sensitive processing method further comprises:

calculating two approaching or touching positions of the ring electrodes and the one or more ring electrodes according to the head signal sensing image;

calculating a projected direction of the active stylus according to the two approaching or touching positions; and calculating a tilt angle between the active stylus and the touch panel according to the two approaching or touching positions and an arrangement between the tip electrode and the one or more ring electrodes.

27. The touch sensitive processing method as claimed in claim 26, wherein the sensing circuit module is configured to sense the first head signal during a first head signal period of the head signal period, the sensing circuit module is configured to sense the third head signal during a third head signal period of the head signal period.

28. A touch sensitive processing apparatus which is applicable to a touch panel, wherein the touch panel comprises multiple first electrodes in parallel to a first axis and multiple second electrodes in parallel to a second axis, wherein the touch sensitive processing apparatus comprising:
an interconnection network module for connecting the first electrodes and the second electrodes, respectively;
a driving circuit module for providing driving signal;
a sensing circuit module for sensing electrical signals; and
a processor module for executing instructions stored in a non-volatile memory to realize:
having the interconnection network module connect the driving circuit module to the first electrodes;
having the driving circuit module emit beacon signal;
having the interconnection network module connect the sensing circuit module with the first and the second electrodes;
during a tail signal period, having the sensing circuit detect tail signal via the second electrodes and the first electrodes to gather a first-axis tail signal sensing information and a second-axis tail signal sensing information;
during a head signal period, having the sensing circuit detect head signal via the second electrodes and the first electrodes to gather a first-axis head signal sensing information and a second-axis head signal sensing information; and
calculating an approaching or touching position of an active stylus and a touching end information related to which one of a head end and a tail end of the active stylus approaching or touching the touch panel according to the first-axis tail signal sensing information, the second-axis tail signal sensing information, the first-axis head signal sensing information, and the second-axis head signal sensing information.

29. The touch sensitive processing apparatus as claimed in claim 28, wherein the tail signal period and the head signal period are adjacent to each other, and no guard period is in between.

30. The touch sensitive processing apparatus as claimed in claim 28, wherein the one-dimensional head signal sensing information comprises sensing information of a first head signal and a second head signal, signal strength of the second head signal is corresponding to a pressure on a force sensing component installed in the head end of the active stylus, wherein the processor module is further configured for calculating a value of the pressure according to signal strengths of the first head signal and the second head signal.

31. The touch sensitive processing apparatus as claimed in claim 30, wherein the sensing circuit module sense the first head signal during a first head signal period of the head signal period, and the sensing circuit module sense the second head signal during a second head signal period of the head signal period.

32. The touch sensitive processing apparatus as claimed in claim 28, wherein a head electrode of the active stylus comprises a tip electrode and one or more ring electrodes, wherein one of the ends of the active stylus are surround by the one or more ring electrodes, wherein the one-dimensional head signal sensing information comprises sensing information of a first head signal and a third head signal, wherein the first head signal is emitted by the tip electrode, the third head signal is emitted by the one or more ring electrodes, wherein the processor module is further configured for:
calculating two approaching or touching positions of the ring electrodes and the one or more ring electrodes according to the head signal sensing image;
calculating a projected direction of the active stylus according to the two approaching or touching positions; and
calculating a tilt angle between the active stylus and the touch panel according to the two approaching or touching positions and an arrangement between the tip electrode and the one or more ring electrodes.

33. The touch sensitive processing apparatus as claimed in claim 32, wherein the sensing circuit module is configured to detect the first head signal during a first head signal period of the head signal period, the sensing circuit module is configured to detect the third head signal during a third head signal period of the head signal period.

34. A touch system, comprising: the touch panel and the touch sensitive processing apparatus as claimed in claim 28.

35. A touch sensitive processing method for a touch sensitive apparatus which is applicable to a touch panel, wherein the touch panel comprises multiple first electrodes in parallel to a first axis and multiple second electrodes in parallel to a second axis, wherein the touch sensitive processing method comprising:
having an interconnection network module of the touch sensitive processing apparatus connect the driving circuit module to the first electrodes;
having a driving circuit module of the touch sensitive processing apparatus emit beacon signal;
having the interconnection network module connect the sensing circuit module with the first and the second electrodes;
during a tail signal period, having the sensing circuit sense tail signal via the second electrodes and the first electrodes to gather a first-axis tail signal sensing information and a second-axis tail signal sensing information;
during a head signal period, having the sensing circuit sense tail signal via the second electrodes and the first electrodes to gather a first-axis head signal sensing information and a second-axis head signal sensing information; and
calculating an approaching or touching position of an active stylus and a touching end information related to which one of a head end and a tail end of the active stylus approaching or touching the touch panel according to the first-axis tail signal sensing information, the second-axis tail signal sensing information, the first-axis head signal sensing information, and the second-axis head signal sensing information.

36. The touch sensitive processing method as claimed in claim 35, wherein the tail signal period and the head signal period are adjacent to each other, and no guard period is in between.

37. The touch sensitive processing method as claimed in claim 35, wherein the one-dimensional head signal sensing information comprises sensing information of a first head signal and a second head signal, signal strength of the second head signal is corresponding to a pressure on a force sensing component installed in the head end of the active stylus, wherein the touch sensitive processing method further comprises: calculating a value of the pressure according to signal strengths of the first head signal and the second head signal.

38. The touch sensitive processing method as claimed in claim 37, wherein the sensing circuit module sense the first head signal during a first head signal period of the head signal period, and the sensing circuit module sense the second head signal during a second head signal period of the head signal period.

39. The touch sensitive processing method as claimed in claim 35, wherein a head electrode of the active stylus comprises a tip electrode and one or more ring electrodes, wherein one of the ends of the active stylus are surround by the one or more ring electrodes, wherein the one-dimensional head signal sensing information comprises sensing information of a first head signal and a third head signal, wherein the first head signal is emitted by the tip electrode, the third head signal is emitted by the one or more ring electrodes, wherein the touch sensitive processing method further comprises:

calculating two approaching or touching positions of the ring electrodes and the one or more ring electrodes according to the head signal sensing image;

calculating a projected direction of the active stylus according to the two approaching or touching positions; and calculating a tilt angle between the active stylus and the touch panel according to the two approaching or touching positions and an arrangement between the tip electrode and the one or more ring electrodes.

40. The touch sensitive processing method as claimed in claim 39, wherein the sensing circuit module is configured to sense the first head signal during a first head signal period of the head signal period, the sensing circuit module is configured to sense the third head signal during a third head signal period of the head signal period.

* * * * *